United States Patent
Li et al.

(10) Patent No.: US 10,623,331 B2
(45) Date of Patent: Apr. 14, 2020

(54) HYBRID CLOUD DEPLOYMENT FOR HYBRID UNIFIED COMMUNICATIONS

(71) Applicant: Mitel Networks, Inc., Mesa, AZ (US)

(72) Inventors: Bingjun Li, San Jose, CA (US);
Pankaj Malhotra, Saratoga, CA (US);
Deepak M. Bhimasena, Karanataka (IN)

(73) Assignee: Mitel Networks, Inc., DE (US)

( * ) Notice: Subject to any disclaimer, the term of this patent is extended or adjusted under 35 U.S.C. 154(b) by 0 days.

(21) Appl. No.: 16/261,221

(22) Filed: Jan. 29, 2019

(65) Prior Publication Data
US 2019/0158423 A1 May 23, 2019

Related U.S. Application Data

(63) Continuation of application No. 15/160,180, filed on May 20, 2016, now Pat. No. 10,230,662.

(51) Int. Cl.
*G06F 15/173* (2006.01)
*H04L 12/927* (2013.01)
(Continued)

(52) U.S. Cl.
CPC ........ *H04L 47/801* (2013.01); *H04L 41/0893* (2013.01); *H04L 43/0817* (2013.01); *H04L 43/0882* (2013.01); *H04L 47/2416* (2013.01)

(58) Field of Classification Search
CPC .............. H04L 47/801; H04L 47/2416; H04L 41/0893; H04L 43/0882
See application file for complete search history.

(56) References Cited

U.S. PATENT DOCUMENTS 7,376,125 B1 5/2008 Hussain et al.
8,155,158 B2 4/2012 Saavedra
(Continued)

FOREIGN PATENT DOCUMENTS

KR 1020150132859 A 11/2015
WO WO 2015/050549 A1 4/2015

OTHER PUBLICATIONS

Publication, Technology—Bigleaf Networks, "Architecture"; data:text/html; charset=utf-8%3Ch3%20style%3D%22margin%3A%200px%3B%20padding%3A%200px%B520border%3A%200px%3B%20font-weight% BA, Oct. 15, 2015; 5 pgs.
(Continued)

*Primary Examiner* — Jonathan A Bui

(57) ABSTRACT

A hybrid unified communications (UC) cloud system includes a global UC virtual data center and a plurality of regional UC virtual data centers (VDCs). Each regional VDC includes a regional system manager that manages a set of regional UC resources. Associated endpoint devices operate in at least one respective multi-tenant regional cloud and to employ corresponding regional UC resources thereof, operating in at least one service cluster of the respective multi-tenant regional cloud, to communicate real-time media traffic with respect to the associated endpoint devices. A regional resource manager provides status information to the regional system manager, based on utilization of resources, to control scaling of the regional UC resources responsive to the status information. The global UC virtual data center includes a global system manager to manage the regional UC VDCs and coordinates orchestration of UC resources between and/or among the regional UC VDCs.

19 Claims, 15 Drawing Sheets

(51) Int. Cl.
*H04L 12/26* (2006.01)
*H04L 12/24* (2006.01)
*H04L 12/853* (2013.01)

(56) References Cited

U.S. PATENT DOCUMENTS

| | | | |
|---|---|---|---|
| 8,209,415 B2 | 6/2012 | Wei | |
| 8,660,129 B1 | 2/2014 | Brendel et al. | |
| 8,817,777 B2 * | 8/2014 | Manian | H04M 3/42365 370/352 |
| 2004/0073640 A1 | 4/2004 | Martin et al. | |
| 2010/0251329 A1 | 9/2010 | Wei | |
| 2014/0033268 A1 * | 1/2014 | Julisch | H04L 63/20 726/1 |
| 2014/0059108 A1 | 2/2014 | Borshack et al. | |
| 2014/0075048 A1 | 3/2014 | Yuksel et al. | |
| 2014/0181267 A1 | 6/2014 | Wadkins et al. | |
| 2014/0280931 A1 | 9/2014 | Braun et al. | |
| 2015/0026346 A1 * | 1/2015 | Yoon | H04L 47/70 709/226 |
| 2015/0156327 A1 | 6/2015 | Van Buren et al. | |
| 2015/0193246 A1 | 7/2015 | Luft | |
| 2015/0319050 A1 | 11/2015 | Kasturi et al. | |
| 2015/0341230 A1 * | 11/2015 | Dave | H04L 41/5058 705/7.29 |
| 2016/0105321 A1 | 4/2016 | Thakkar et al. | |
| 2016/0105488 A1 | 4/2016 | Thakkar et al. | |
| 2016/0337356 A1 * | 11/2016 | Simon | H04L 63/10 |
| 2016/0378526 A1 * | 12/2016 | Venkataramaiah | G06F 9/45558 718/1 |
| 2017/0041384 A1 * | 2/2017 | Son | H04L 67/1002 |
| 2017/0149767 A1 * | 5/2017 | Hinton | H04L 63/10 |
| 2017/0163644 A1 * | 6/2017 | Horii | H04L 63/10 |
| 2017/0242774 A1 * | 8/2017 | Gopu | G06F 11/3688 |
| 2017/0300359 A1 * | 10/2017 | Kollur | G06F 9/5022 |

OTHER PUBLICATIONS

Publication, "PF: Packet Queueing and Prioritization", Open BSD; http://www.openbsd.org/faq/pf/queueing.html; Oct. 11, 2015; 13 pgs.
Cisco Systems Handbook, "Quality_of_Service_Networking"; Oct. 16, 2012; 31 pgs.
Publication, "Acceleration Systems Technical Overview"; Acceleration Systems; Sep. 2014, v1.4; 7 pgs.
Frank Durr, "Technical Report Apr. 2012, Towards Cloud-assisted Software-defined Networking"; Institute of Parallel and Distributed Systems; Aug. 2012; 19 pgs.
Justine Sherry, et al., "Making Middleboxes Someone Else's Problem: Network Processing as a Cloud Service"; SIGCOMM'12; Aug. 13-17, 2012; 12 pgs.
Hasan T. Karaoglu, et al.; "offloading Routing Complexity to the Cloud(s)"; IEEE International Conference on Communications 2013; IEEE ICC'13—Workshop on Cloud Convergence: challenges for future infrastructures and services (WCC 2013); Jun. 9-13, 2013; 5 pgs.

* cited by examiner

HYBRID CLOUD DEPLOYMENT FOR HYBRID UNIFIED COMMUNICATIONS

CROSS-REFERENCE TO RELATED APPLICATIONS

This application is a continuation of and claims priority to U.S. patent application Ser. No. 15/160,180 filed on May 20, 2016, the disclosure of which is incorporated herein by reference to the extent such disclosure does not conflict with the present disclosure.

TECHNICAL FIELD

This disclosure relates generally to configuring and operating a hybrid cloud for hybrid unified communications.

BACKGROUND

Unified communication (UC) generally relates to the integration of real time, enterprise communication services and devices, such as can include instant messaging, presence information, voicemail, mobility, audio, video conferencing and the like. UC generally is implemented as a set-up of products or services to provide a common user experience across the various devices and media types. Generally, the UC systems can be implemented as premise-based systems, such as for an enterprise that may have one office location or multiple offices distributed across a region. In some examples, the UC system can be implemented partly in the premises, partly in the cloud or, in other examples, it may be totally in the cloud. The cloud implementation typically is a private cloud or, in other examples, a public cloud.

UC deployment in a private cloud has a limitation of elastic scalability (hardware resources are fixed and hard to support busting workload) and implementing high availability in private cloud is expensive as it needs standby resources. UC deployment in a public cloud has the limitation of real-time media quality of service (QoS) (e.g., jitter and the like) and issues to accommodate service level agreement (SLA), as the Unified Communications provider may not be in a position to guarantee dedicated resources on networking, compute, and storage with the required QoS.

SUMMARY

This disclosure relates generally to configuring and operating a hybrid cloud for hybrid unified communications.

One example relates to a hybrid unified communications (UC) cloud system that includes a plurality of regional UC virtual data centers. Each regional UC virtual data center operating independently and including a regional system manager and a regional resource manager. The regional system manager to manage a set of regional UC resources implemented in a respective multi-tenant regional cloud having, associated endpoint devices being registered to operate in at least one respective multi-tenant regional cloud and to employ corresponding regional UC resources thereof, operating in at least one service cluster of the respective multi-tenant regional cloud, to provide unified communication services to the associated endpoint devices. The regional resource manager to monitor utilization of regional UC resources and provide status information to the regional system manager based on the utilization of resources, the regional system manager to control scaling of the set of regional UC resources in response to the status information. A global virtual data center includes a global system manager that manages each of the regional UC virtual data centers and coordinates orchestration of UC resources between and/or among the regional UC virtual data centers.

Another example relates to one or more non-transitory machine readable media having instructions executable by at least one processor to perform a method of deploying unified communications (UC) in a hybrid cloud. The method includes independently managing a set of regional UC resources implemented in each of a plurality of regional UC virtual data centers, associated endpoint devices being registered to utilize UC services deployed in at least one respective regional UC virtual data center and to employ corresponding regional UC resources thereof, operating in at least one service cluster of the respective multi-tenant regional cloud, to provide unified communication services to the associated endpoint devices. The method includes globally managing each of the plurality of regional UC virtual data centers and coordinating orchestration of UC resources between and/or among the regional UC virtual data centers. The method includes independently monitoring, at each of the plurality of regional UC virtual data centers, utilization of respective regional UC resources to provide status information based on the utilization of resources, and controlling, at each of the plurality of regional UC virtual data centers, scaling of the set of regional UC resources based on the status information monitored for each respective regional UC data center.

DETAILED DESCRIPTION

Figure 1:
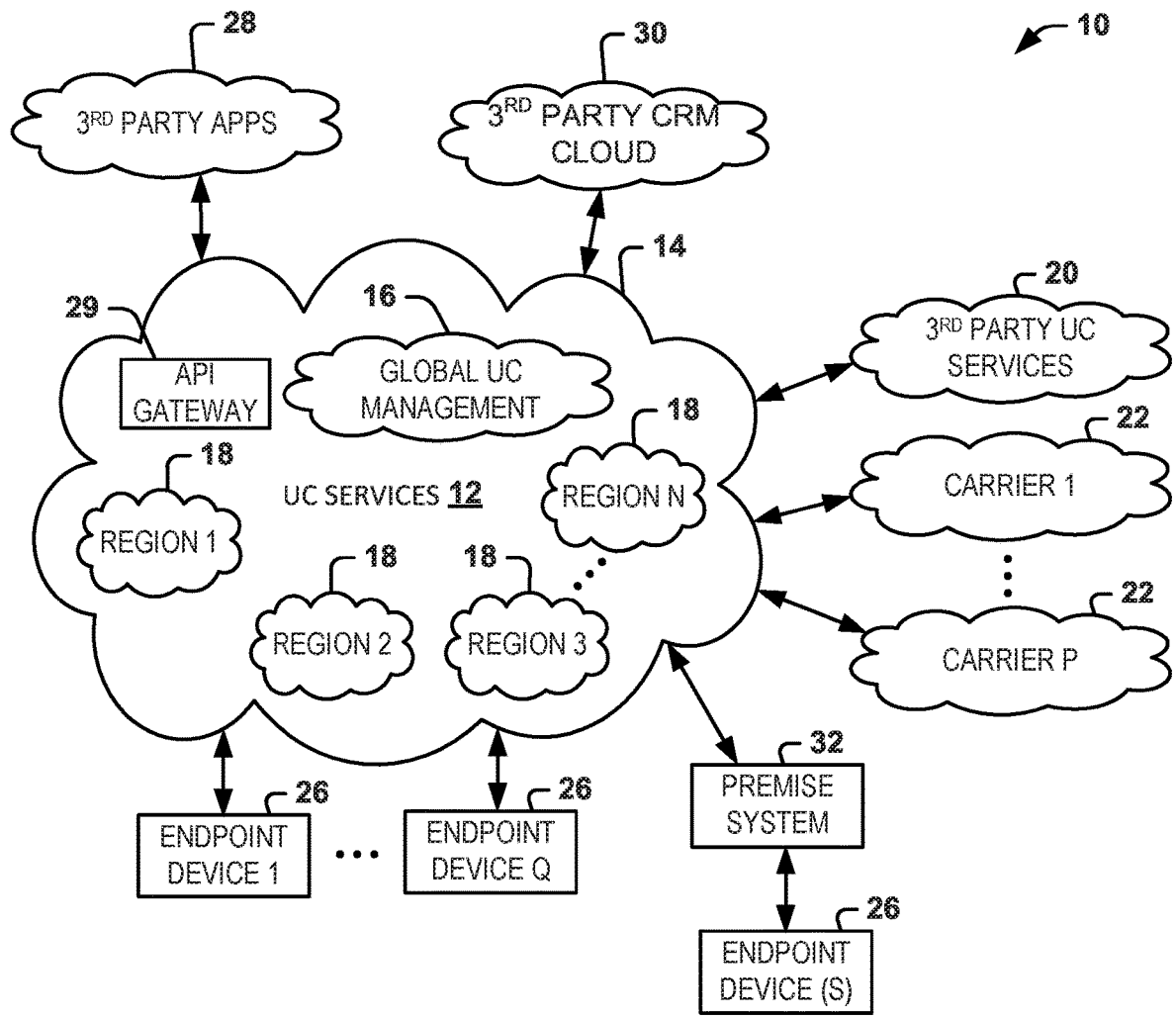
FIG. 1 depicts an example of a hybrid cloud unified communication system.

This disclosure relates to deployment of a unified communication (UC) system in a hybrid cloud, which can include a combination of public and private cloud systems. The hybrid cloud deployment for UC services provides benefits of elastic scalability of public cloud, while concurrently enabling adequate quality of service and ability to meet service level agreements that are implemented in the private cloud infrastructures. As used herein, UC systems, including public and/or private UC cloud architectures and premise systems, integrate real-time communication services (e.g., instant messaging (chat), presence information, telephony, mobility, audio conferencing, contact center functions, video conferencing, data sharing, call control and speech recognition) with non-real-time communication services (e.g., integrated voicemail, transcription services, e-mail, short message service, and fax).

As disclosed herein, systems and methods employ a global UC management layer to manage UC services deployed in a hybrid multi-cloud architecture. For example, a global virtual data center can implement the global UC management layer to manage each of a plurality of regional UC virtual data centers. Each of the regional UC virtual data centers can be implemented as a private cloud, public cloud or a hybrid cloud that includes both public and private clouds. For instance, each regional UC virtual data center can provide UC resources for a geographical region, such as a portion of a country, a country or multiple countries. Similarly, the global virtual data center can run inside a public or private cloud to implement its high-level management function for the regional UC virtual data centers. For instance, the global UC management layer (e.g., a virtual data center) provides the overall management capability of software publication, service package publication, overall Back Office Support System (BOSS) management, as well as coordinates the UC features that require coordination across multiple regional UC virtual data centers. In addition to various hybrid cloud architectures, application interfaces can be implemented within the system to integrate third party applications or services with the multi-tenant use system. As a result, utilizing hybrid cloud capabilities to deploy the UC services, the systems and methods disclosed herein can provide high availability and efficiencies beyond other approaches.

As used herein, a hybrid cloud refers to a composition of two or more clouds (private or public) that remain distinct entities but are bound together, offering the benefits of multiple deployment models. Hybrid cloud can also encompass the ability to connect collocation, managed services with private cloud resources. In the context of the hybrid UC cloud systems and methods disclosed herein, a private cloud virtual data center refers to a multi-tenant private cloud infrastructure with cloud UC services that works with on-premises UC services together. It can be operated by an operator/service provider that is the same or different from the global virtual datacenter operator/service provider. By contrast, a public cloud virtual data center generally refers to a system where the UC services are rendered over a public cloud where its compute, network, and storage infrastructure is available for public use. As used herein, each UC cloud system can include a variety of hardware and/or software UC resources, including servers, private branch exchanges (PBXs), routers, switches and databases, for example. For example, such resources can include processors, memory, servers, software, applications, that cooperate to provide unified communication services for users.

FIG. 1 depicts an example of a system 10 that includes hybrid UC services deployed in a hybrid computing cloud architecture. As disclosed herein, hybrid computing cloud implements a plurality of different cloud architectures, such as public cloud and/or private cloud within each respective cloud. In the example of FIG. 1, the UC services 12 implemented in the hybrid cloud 14 include global UC management layer 16 that operates at the top level of the hybrid cloud 14 for managing each of a plurality of respective regional clouds 18, demonstrated as Regions 1 through Region N, where N is a positive integer denoting the number of regional clouds in which the UC services have been deployed for the UC system. As disclosed herein, the hybrid cloud architecture provided by the system 10 affords a rich set of UC services distributed across a broad geographic area such as can include multiple countries or even continents. The global UC management layer constitutes a global UC virtual data center that is configured to manage multiple the regional virtual data centers (e.g., configured as a public cloud and/or private cloud), corresponding to clouds for Regions 1 through Region N.

The hybrid cloud 14 can implement a set of application interfaces (e.g., in an API gateway) to integrate with third party UC services demonstrated at 20. Thus, third party UC services 20 can be implemented ubiquitously as part of the hybrid cloud 14, which can be managed as part of an SLA within the hybrid cloud 14. Additionally, the system 10 can integrate with multiple carriers for providing real time UC services to end points or application services that do not reside within the hybrid cloud 14. There can be any number of such carriers 22, demonstrated as carriers 1 through carrier P (P being a positive integer).

The system 10 can also integrate with third party applications 28 via an API gateway 29, such as including APIs for controlling interactions with each of the third party applications. The API gateway 29 can control access to or from the third party applications 28. Similarly, APIs can be provided to integrate with third party customer relationship manager (CRM) cloud services 30. Thus, the API gateway 29 can provide rich set of scalable APIs to interface with third party applications and services.

The system 10 can include any number and type of endpoint devices 26 that can be implemented within or connected to the hybrid cloud 14 via a corresponding communications link. For example, endpoint devices 26, demonstrated as endpoint device 1 through Q (Q being a positive integer) can be registered for operation within any one or more of the regional clouds 18 for accessing corresponding UC services implemented by or otherwise accessible via such regional clouds. In other examples, an endpoint device can access UC services in the hybrid cloud via a trusted connection (e.g., a predetermined telephone number or other access mechanism, such as a resource address) that has been provided to an authorized user. One or more of the endpoint devices 26 can be connected to the premise system 32 and/or connected directly to the UC services cloud 12. By way of example, the endpoint devices 26 can include a personal computer, laptop, smart phone, personal digital assistance (PDA), a voice over Internet protocol (VoIP) phone, a video phone, a desktop phone or the like. For example, the endpoint devices 26 registered for operating within premise system 32 can be connected with the UC services of one or more of the regions 18 via a corresponding secure channel or a virtual private network (VPN) implemented over public and/or private networks.

As used herein, a premises based system (system 32) refers to a private network that is administered and/or operated by or on behalf of a private entity (e.g., a company, group of users, or other service provider) that is different from the entity operating the hosted, cloud-based system. The premises based system can be implemented locally at a single site or it can be distributed across multiple sites but operated as a single enterprise, such as a unified communication (UC) system.

Figure 2:
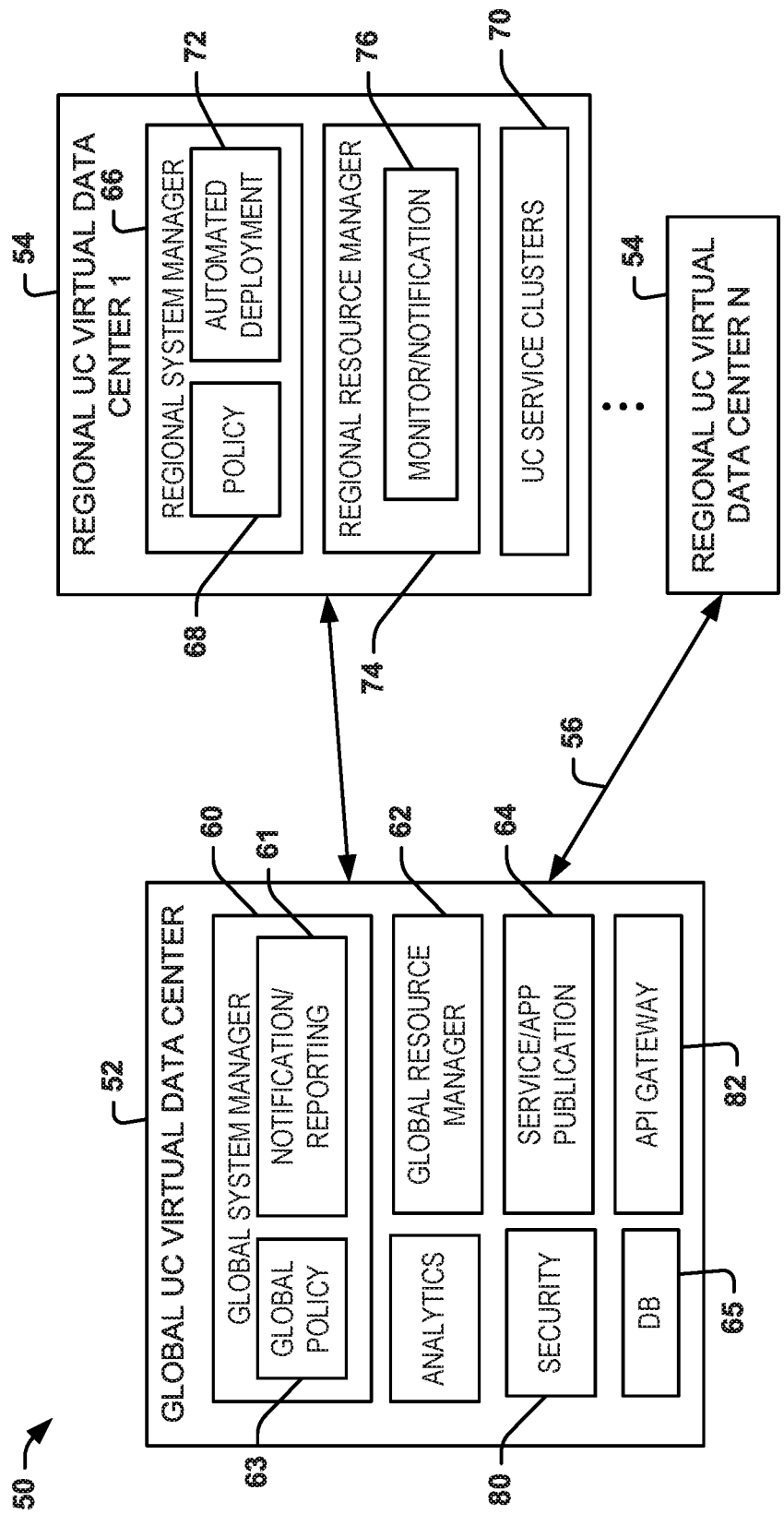
FIG. 2 depicts an example of virtual data centers that can be utilized to implement a hybrid cloud unified communication system.

FIG. 2 depicts an example of a UC hybrid cloud system 50 that includes a global UC virtual data center 52 and a plurality of regional UC virtual data centers 54, demonstrated at 1 through N, where N is a positive integer denoting the number of regional UC virtual data centers. Each regional UC virtual data center 54 can correspond to a UC cloud (e.g., public and/or private) that provides UC services for a geographical region, such as a country, a group of countries or a region within one or more countries. In some examples, a given region may be contiguous geographically or, in other examples, it may include non-contiguous geographic regions. In any case, each regional UC virtual data center 54 manages UC cloud resources within a regional cloud of the UC hybrid cloud system 50. The global UC virtual data center 52 can correspond to the global UC management layer 16 of FIG. 1, which operates as a high level management layer of the UC hybrid cloud system 50 and thus manages all of the respective regional UC virtual data centers 54. The global UC virtual data center 52 thus can be coupled to each regional UC virtual data center 54 via a secure link 56 that can include physical media and/or wireless connections. For instance, the secure link can be a VPN (e.g., a VPN tunnel) or other secure link (e.g., implementing a secure communication protocol, such as HTTPS or the like). As disclosed herein, each of the global UC virtual data center 52 and the regional UC virtual data centers 54 can be implemented as services deployed in a public cloud, private cloud or distributed across public and private clouds.

The global UC virtual data center 52 includes a global system manager 60 to manage the respective regional UC virtual data centers 54. The system manager 60 perform orchestration based on the UC resource management status for each regional UC virtual data center, such as to implement automated arrangement, coordination, and management of complex computer systems, middleware and services in the system (e.g., in and among the regions in the cloud 14). Management functions, for example, include notifying regional UC virtual data centers 54 of new/updated UC service components that are available for deployment and upgrade. The global system manager 60 implements a notification/reporting function (e.g., a service) 61 to notify the regional UC virtual data centers 54 of UC service components available for deployment, including upgrades containing one or more new components. The global system manager 60 implements its management function according to established policy data 63, which can be set by a global administrator or other authorized user and stored in a master global database 65. As used herein, an upgrade refers to new version of software code to replace a prior version, such as includes minor improvements (e.g., updates) or major software enhancements. Deployment of the upgrade thus operates to bring UC cluster services where it is used up to date and/or improve operating characteristics.

As an example, the global system manager 60 manages global publication of components, UC services and service packages in the UC hybrid cloud 50. For example, the global system manager 60 can provide different levels of UC services available for deployment in the respective regions in which the regional UC virtual data center 54 are implemented, according to the global policy 63. For example, the policy 63 can set parameters to establish different UC service packages available that can be implemented in each respective regional UC virtual data center 54. Each regional UC virtual data center 54 can deploy a plurality of different sets of UC services utilized by users of the UC hybrid cloud depending on each subscribers' SLA, which can specify resource capacity limits, a set of UC services and the like. Thus, the global system manager 60 provides control and management of cloud resources and associated services distributed across the hybrid UC cloud within the regional UC virtual data centers 54.

The global UC virtual data center 52 can control access to the various UC services and components that are to be published. Additionally, the global system manager 60 can implement security service 80 to enable the regional UC virtual data centers to issue certificates that can be utilized to selectively control access to the UC services by end points in any one or more of the respective regional data centers based upon the authorization associated with such digital certificates.

The global UC virtual data center 52 can also include an API gateway 82 can be utilized to provide access to third party applications and integrate other third party UC resources in the UC architecture 50. The API gateway 82 can be programmed to monitor the number or requests to ascertain whether the requests are appropriate, and control issuance of digital certificates. The API gateway 82 thus can enable integration and facilitate automated access to the UC cloud resources deployed in the UC cloud architecture 50. API Gateway also allows rate limiting for each API, e.g. how many calls per time period (minute, hour, day or other time period).

The global UC virtual data center 52 includes a service/app publication module 64 into which developers or other third parties can publish components of applications or services that are to be deployed within the UC hybrid cloud architecture 50. The service/app publication module 64 thus can store an image of the application or service in a corresponding global database 65. In response to the service/app being provided into the database 65 and the data appropriately stored therein, the global system manager 60 can employ the notification/reporting service 61 to, in turn, send a notification via the secure links 56 to each of the regional UC virtual data centers 54. For example, the regional system manager 66 in each regional UC virtual data center 54 can be programmed with the corresponding policy 68 to control actions executed with respect to management of its resources in response to notifications received from the global virtual data center 52.

For example, the regional system manager 66 can employ its associated policy 68 to ascertain whether or not to pull the identified application/service component that has been loaded into the global database 65 in response to the notification. The policy 68 can determine whether or not to retrieve the published UC component, for example. As another example, the policy 68 can dictate timing parameters that specify a schedule to retrieval and/or deploy the published UC component. In this way each of the regional UC virtual data centers 54 can implement different policies associated within the region in which they are implemented, such as to accommodate unique timing requirements or local government rules and regulations associated with the geographical region in which each regional UC virtual data center 54 resides. The policy 68 can contain other procedures and methods to control how to deploy or upgrade its UC services as well as control UC resource utilization. For instance, each regional UC virtual data center 54 can include one or more UC service clusters 70 that include an arrangement of a plurality of virtual machines and/or Docker containers that share respective UC computing resources implemented within the respective regional UC virtual data center.

The regional system manager 66 can also include a deployment engine 72 that controls and handles deployment of UC services and application components via virtual machines and/or Docker containers implemented using UC computing resources in the regional UC virtual data center 54. The deployment engine 72, for instance, can employ the policy 68 to manage the deployment and/or upgrade of UC services within the respective regional UC virtual data center, such as disclosed herein. In some examples, the regional system manager 66 of a given regional UC virtual data center 54, which may be implemented as a public and/or private cloud, can deploy UC services of one or more different types using dedicated hardware (referred to herein and in the drawings as "dedicated UC Services"). For instance, the dedicated UC service (e.g., voicemail, instant messaging, conferencing or the like) can be implemented in UC service clusters utilizing dedicated server hardware instances implemented within the given regional UC virtual data center 54. For example, the dedicated server hardware can be programmed to run virtual machines or Docker containers to provide the corresponding UC services. In other examples, there may be no dedicated instances for UC service clusters operating within a given regional UC virtual data center 54.

Additionally, each regional UC virtual data center 54 can also include a regional resource manager 74. The regional resource manager 74 configures, monitors, and controls the UC resources. The resource manager 74 further supports the system manager on runtime resource orchestration, such as by providing UC resource management status information. The regional resource manager 74 can include a monitor function 76 to monitor activities and utilization of UC resources deployed in each UC service cluster 70. For example, the UC manager 74 can ascertain whether there is under or over utilization of the resources implemented in each UC service cluster 70. For example, the monitor function 76 can include one or more thresholds to ascertain whether adequate resources have provisioned deployed in a respective UC service cluster 70. The monitor function 76 thus can send notification to the regional system manager 66 that can and to implement corresponding resource scaling 78 and/or reporting functions based on its corresponding policy 68.

While each regional data center is independent and separate cloud deployment with respect to each other, there can be cooperation within the UC system such as to support disaster recovery functionality. For example, disaster recovery can be supported within each respective region by utilizing multiple availability zones. Disaster recovery can be implemented by moving workloads across respective regions in response to detecting the occurrence of a disaster for one of the availability zones within a given region. The movement of workloads can be coordinated by the global resource manager, for example.

As disclosed herein, each regional UC virtual data center can be implemented in various permutations of public clouds, private clouds, or hybrid clouds (e.g., using both public and private clouds). It is in this context that FIGS. 3-10 depict examples of different hybrid cloud architectures 100 for implementing hybrid UC systems in which similar components and features implemented throughout the various views of FIGS. 3-10 are designated by the same reference numbers throughout the various views. Each of the UC hybrid cloud architectures 100 can correspond to the hybrid UC system of 10 of FIG. 1 and be implemented according to the UC hybrid cloud system 50 of FIG. 2. Accordingly, reference can be made back to FIGS. 1 and 2 for additional information and context of various similar components disclosed among the respective example architectures of FIGS. 3-10. As such, the following discussion will tend to focus on differences among the respective example UC hybrid cloud architectures of FIGS. 3-10.

Figure 3:
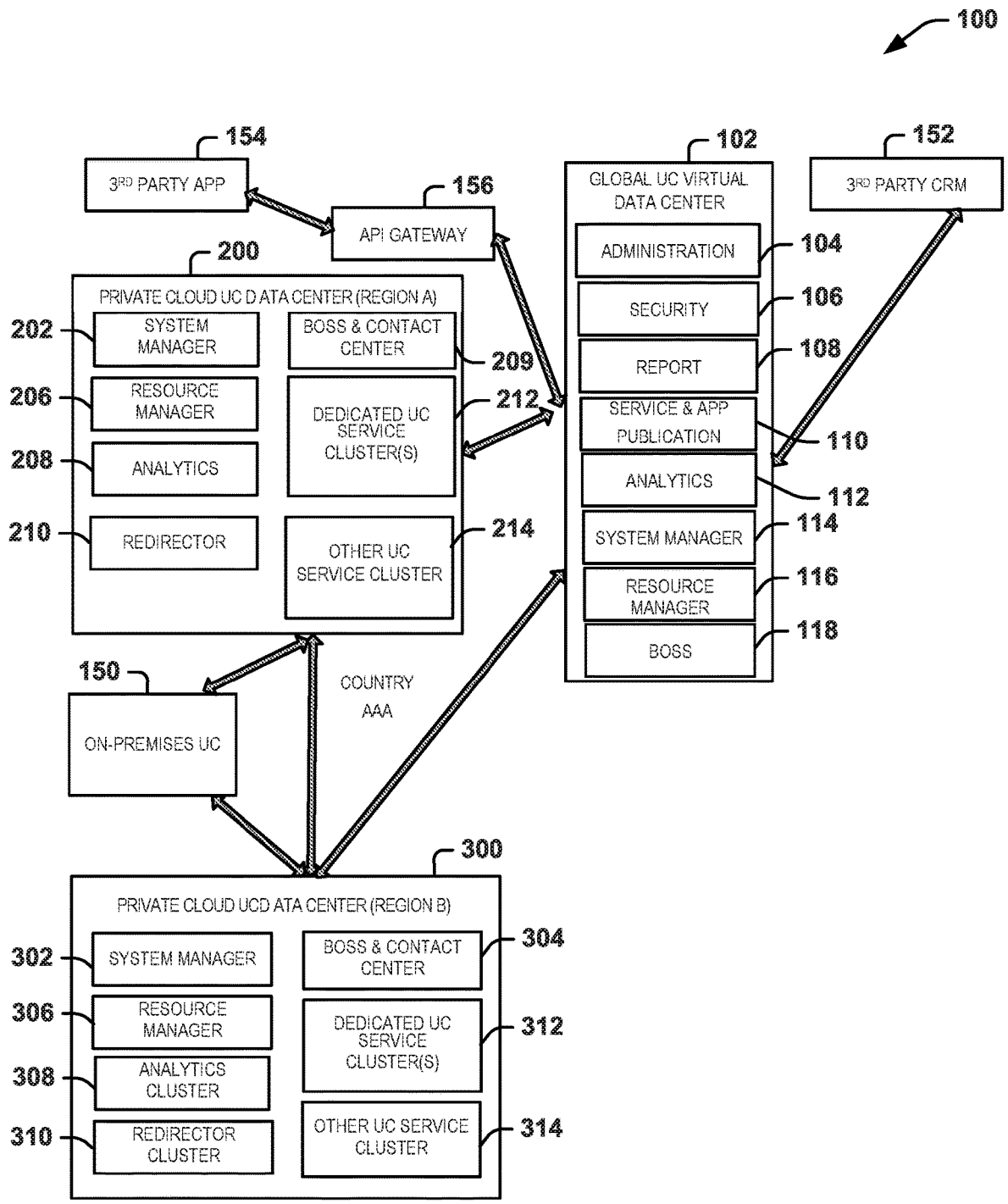
FIG. 3 depicts an example of a unified communication system architecture implementing private clouds.

Referring to the example of FIG. 3, the UC hybrid cloud architecture 100 includes a global UC virtual data center 102 (e.g., corresponding to global UC virtual data center 52) that is coupled via secure link to a plurality of regional UC data centers, which are demonstrated in FIG. 3 as private cloud UC virtual data center 200 for region A and private cloud UC virtual data center 300 for region B. As disclosed herein, there can be any number of two or more regions in a given UC hybrid cloud architecture. The global UC virtual data center 102 includes various services and/or application that can be deployed in a public and/or private cloud to include various services as disclosed herein. For example, global UC virtual data center 102 can include administration functions 104, security services 106, reporting services 108, a publication component 110, analytics 112, a system manager 114, a resource manager 116 and back office system services (BOSS) 118.

The example architecture 100 of FIG. 3 can be referred to as a private cloud UC architecture in which each of the regional UC data centers 200 and 300 operate in corresponding private clouds. Briefly, each private cloud UC data center 200 and 300 includes a system manager 202, 302, BOSS and contact center services 204, 304, a resource manager 206, 306, as well as UC clusters demonstrated as including an analytic cluster 208, 308 and a redirector cluster 210, 310. The redirector cluster can redirect requests for cloud services to another region, such as in response to detecting a disaster that compromises its local services. In the example of FIG. 3, the private cloud UC data center 200 and 300 also include dedicated UC services 212, 312, such including deployment of dedicated VoIP, video call and/or conferencing using dedicated hardware. The dedicated UC services 212, 312 can be implemented in corresponding service clusters implemented as virtual machines or Docker containers within each respective virtual data center 200, 300 using dedicated hardware. Other UC service clusters 214, 314 can also be implemented for other services demonstrated herein.

Additionally, one or more premise UC systems 150 can be implemented within or in conjunction with each regional UC virtual data center 200 and 300 to provide access from the premise to the UC services implemented within the hybrid cloud. Endpoint devices in the premise system 150 can also access UC services and functions implemented within the premise system. The premise UC system can itself implement selected UC services locally (e.g., according to hardware and software within an enterprise system or other network infrastructure (e.g., a private Intranet). The UC services in the hybrid cloud can supplement or complement those implemented by the premise system. In this way the combination of the premise UC system 150 implemented within the architecture of the multi-tenant hybrid cloud UC system 100 can afford a high degree of scalability and functionality for the users. While a single UC system is demonstrated it is understood that there will be a plurality of UC systems each comprising a corresponding "tenant" operating within the multi-tenant hybrid cloud 100.

Also as disclosed herein third party applications 154 can access cloud services and/or make such applications available to cloud users via an API gateway 156. Similarly, other third party services, such as third party CRM services 152 may be integrated with the multi-tenant hybrid cloud UC system 100.

Figure 4:
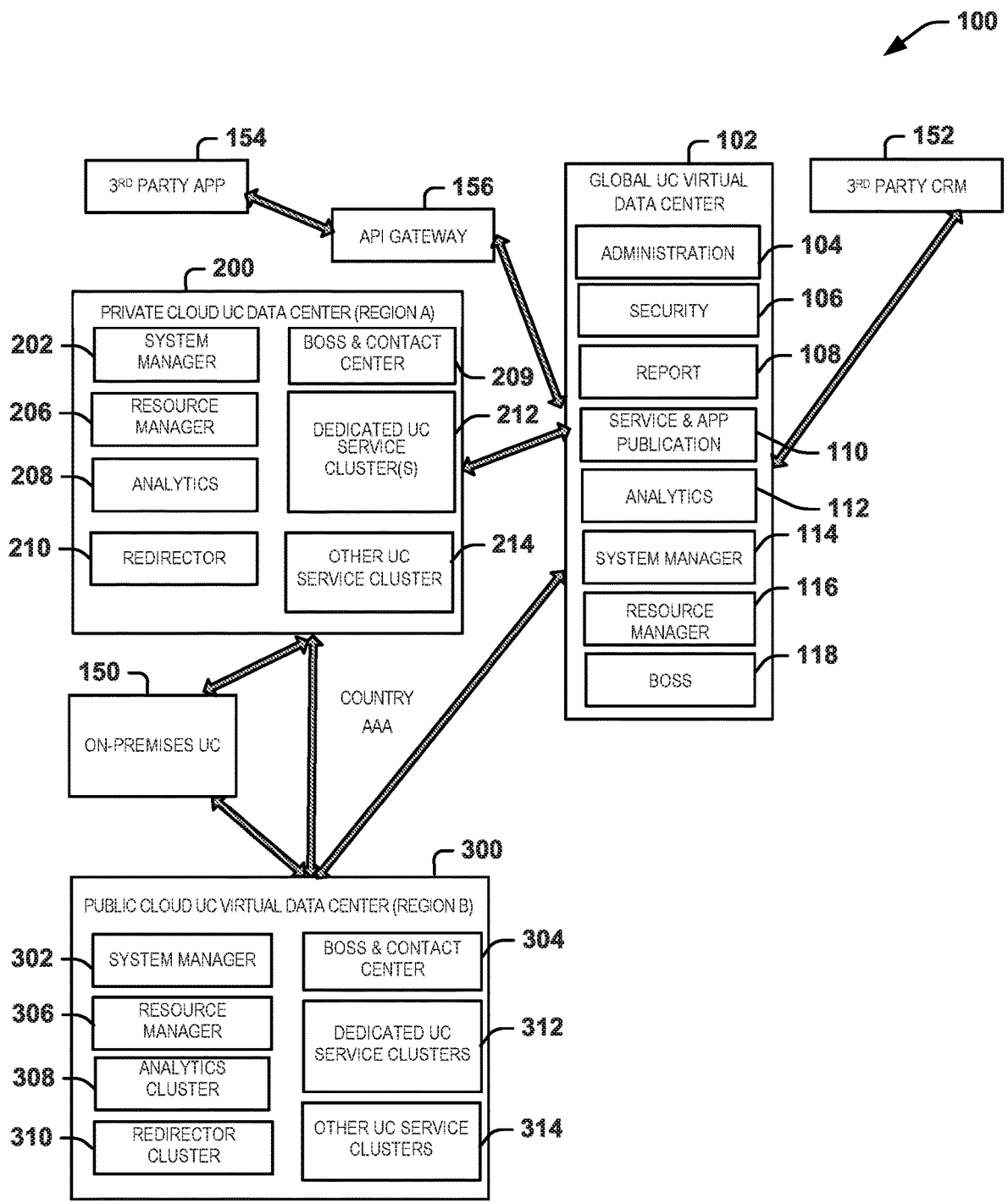
FIG. 4 depicts an example of a unified communication system architecture implementing private and public clouds.

FIG. 4 depicts another example of a UC hybrid cloud architecture 100, which can be referred to as a hybrid cloud type of architecture. In this example, the global UC virtual data center 102 is connected via secure links to regional UC data centers 200 and 300 for regions A and B, respectively, similar to FIG. 3. However, in this example, the regional data centers are deployed a private cloud UC data center 200 for region A and public cloud UC virtual data center 300 for region B. The UC function of each can be implemented in a similar manner such as disclosed with respect to FIG. 3.

Figure 5:
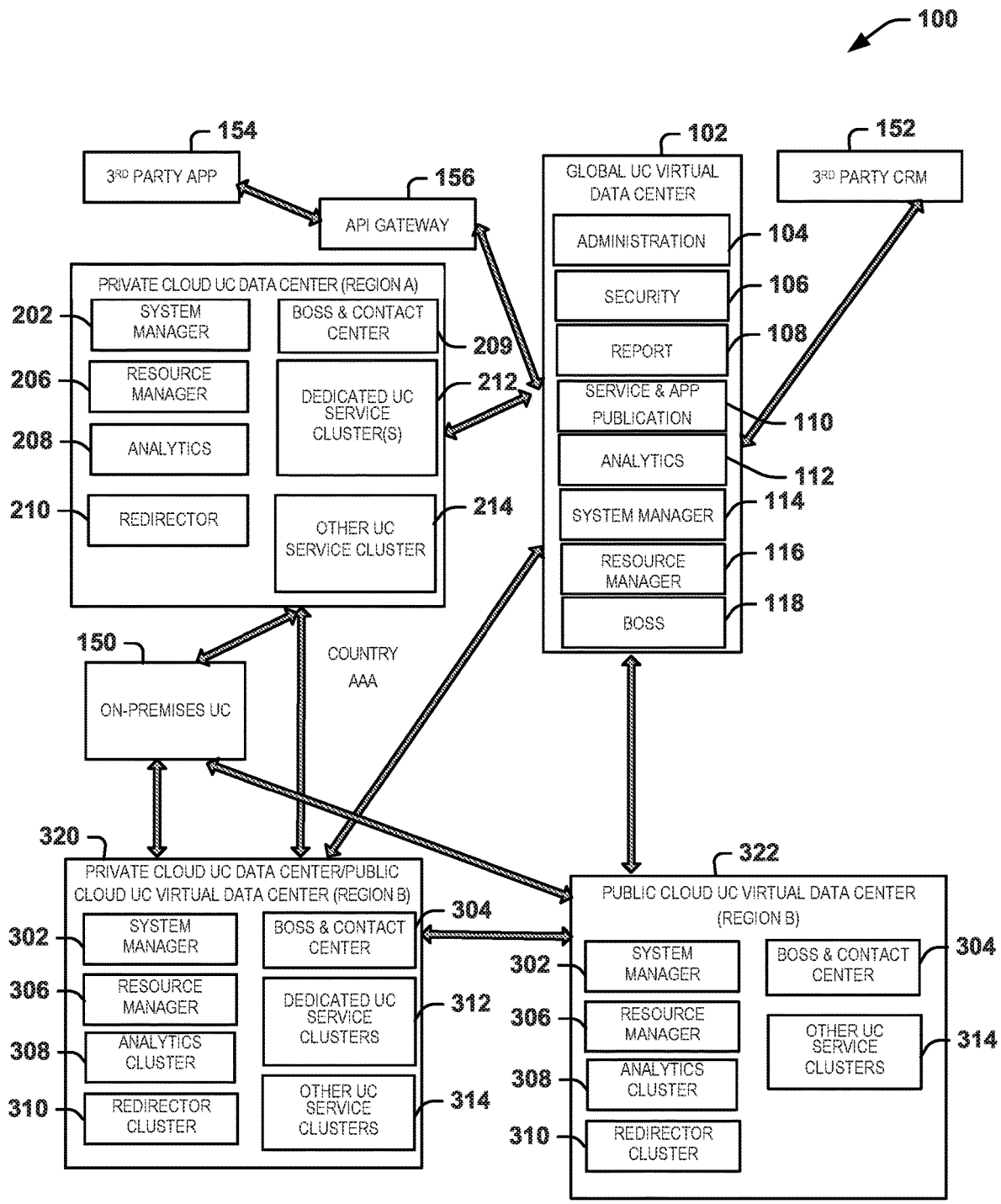
FIG. 5 depicts another example of a unified communication system architecture implementing a combination of private and public clouds.

FIG. 5 depicts another example of an architecture 100 that includes both private and public clouds for regional data centers. Specifically, in FIG. 5, the cloud deployment for region B includes both a public cloud UC data center and a private cloud UC virtual data center with dedicated cluster services, indicated at 320, and another cloud deployment at 322 of a public cloud UC data center without dedicated cluster services. The UC hybrid cloud architecture 100 of FIG. 5 also includes another regional UC virtual data center for region A that is implemented as a corresponding private cloud UC data center 200, similar to the examples of FIGS. 3 and 4.

Figure 6:
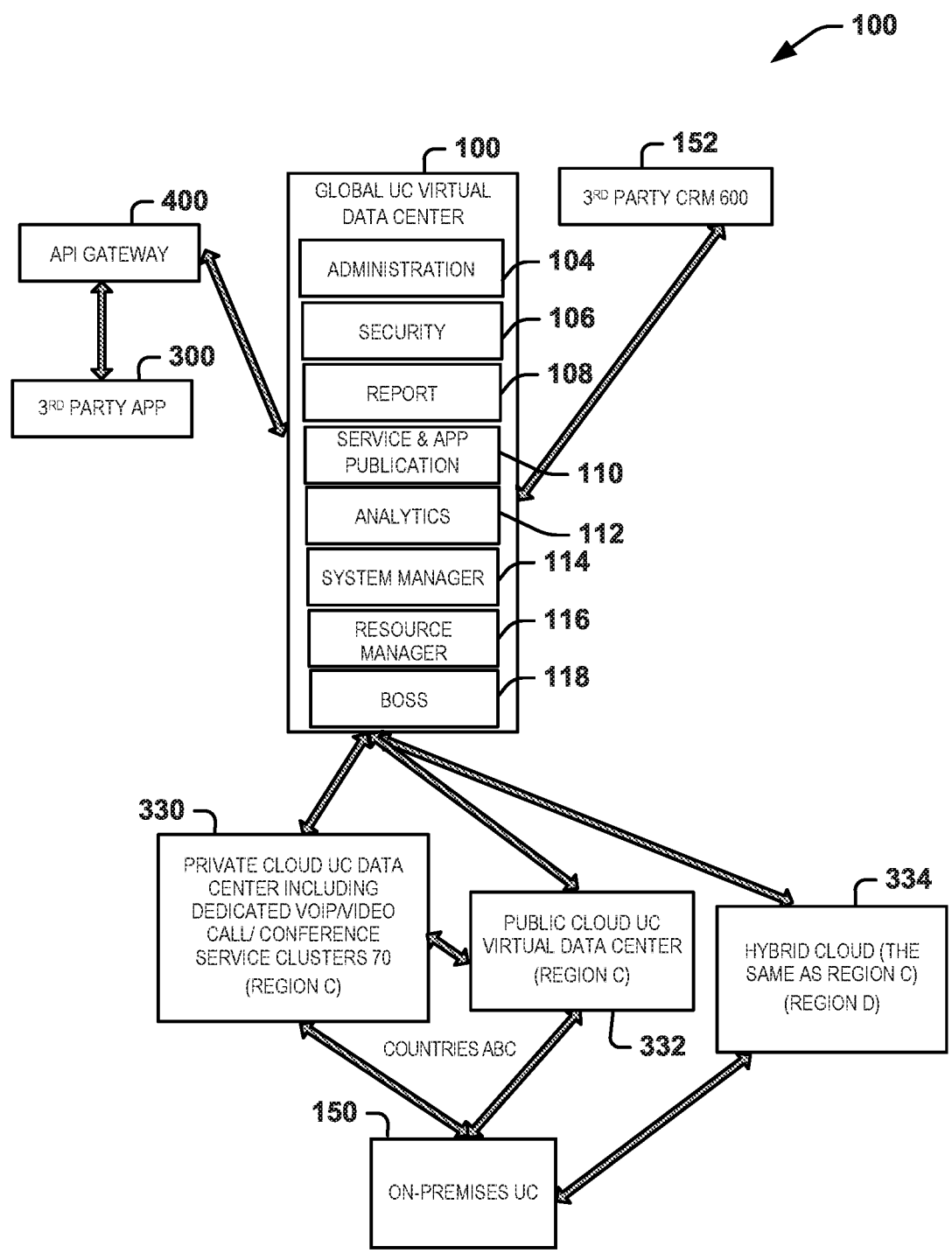
FIG. 6 depicts an example of a unified communication system architecture implementing hybrid clouds within one or more regions.

FIG. 6 depicts another example of a hybrid cloud UC architecture 100. In the example of FIG. 6, the global UC virtual data center 102 is connected via secure links to regional UC virtual data centers for regions C and D. In this example, the virtual data center for region C includes both private and public cloud data centers 330 and 332. In this example, the private cloud UC data center 330 for region C also implements dedicated UC services in corresponding service clusters of the private cloud. The public cloud of the UC virtual data center 332, however, does not implement (i.e., it does not include) dedicated UC service cluster for the dedicated UC components as does the private cloud UC data center 330. As demonstrated in FIG. 6, the regional UC virtual data center 334 for region D can be implemented the same as that shown and described with respect to region C (e.g., a hybrid cloud of private and public clouds). The corresponding on-premise UC system 150 further can be connected via secure links to each of the private and public cloud data centers 330 and 332, with the regional cloud system 334 for region D operating as a predetermined back-up system for the on-premise UC system 150.

Figure 7:
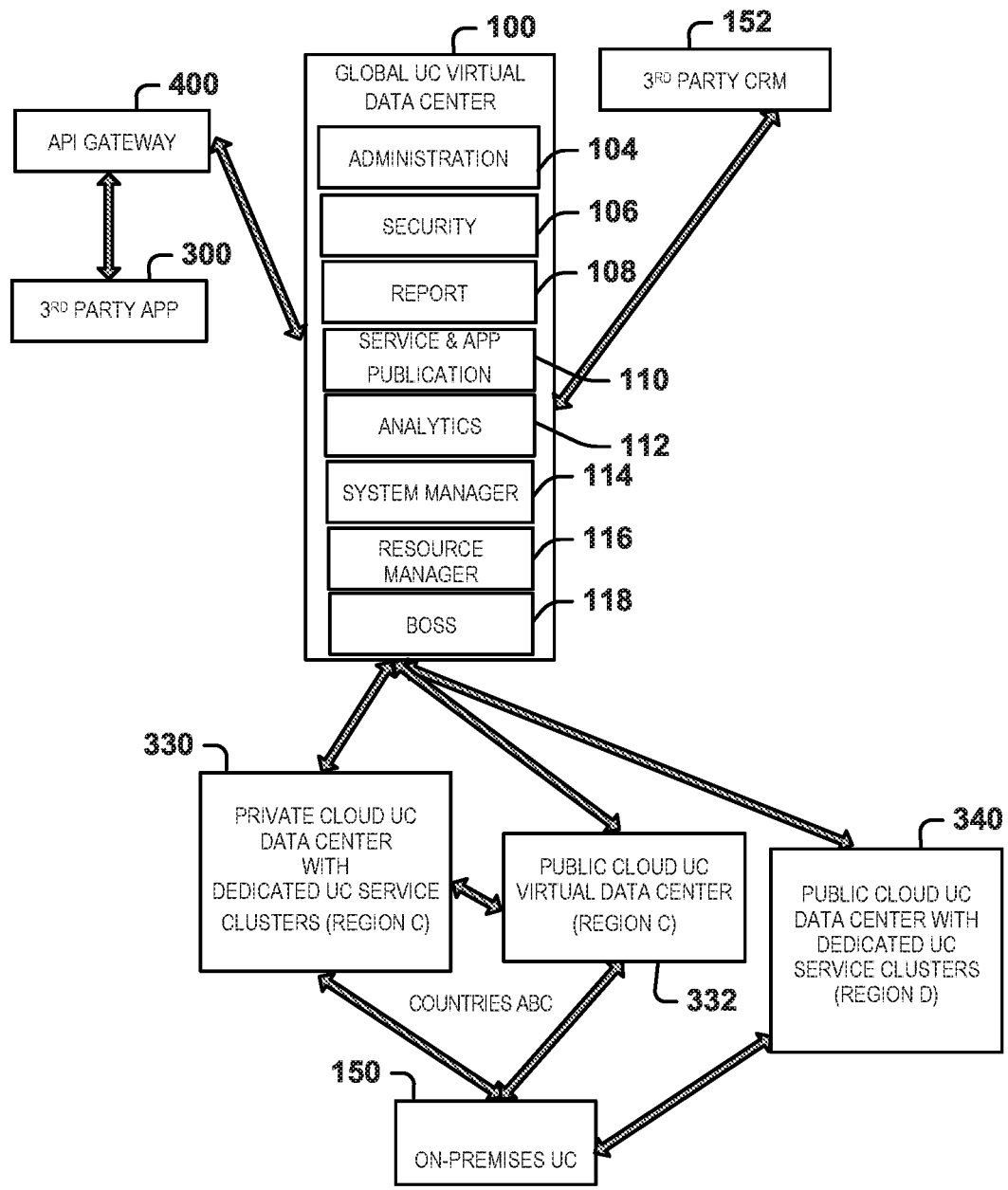
FIG. 7 depicts an example of a unified communication system architecture implementing hybrid clouds within one or more regions and public clouds in one or more other regions.

FIG. 7 demonstrates yet another example UC hybrid cloud architecture 100 in which the global UC virtual data center 102 is connected via secure links to corresponding regional UC virtual data centers for regions C and D. In this example, the regional data centers for region C are the same as demonstrated in FIG. 6, namely including private cloud UC data center 330 and public cloud UC virtual data center 332. However, the regional UC virtual data center for region D, in this example, is implemented as a public cloud UC virtual data center 340, which includes dedicated UC services, such as can be implemented as service clusters of virtual machines and/or Docker containers operating therein using dedicated hardware. The given premise UC system 150 can be connected via secure links to the virtual data centers for region C to access cloud services, such as defined by an SLA. Additionally, a corresponding back-up can be provided, as needed, by moving its cloud resources to the virtual data center of region D.

Figure 8:
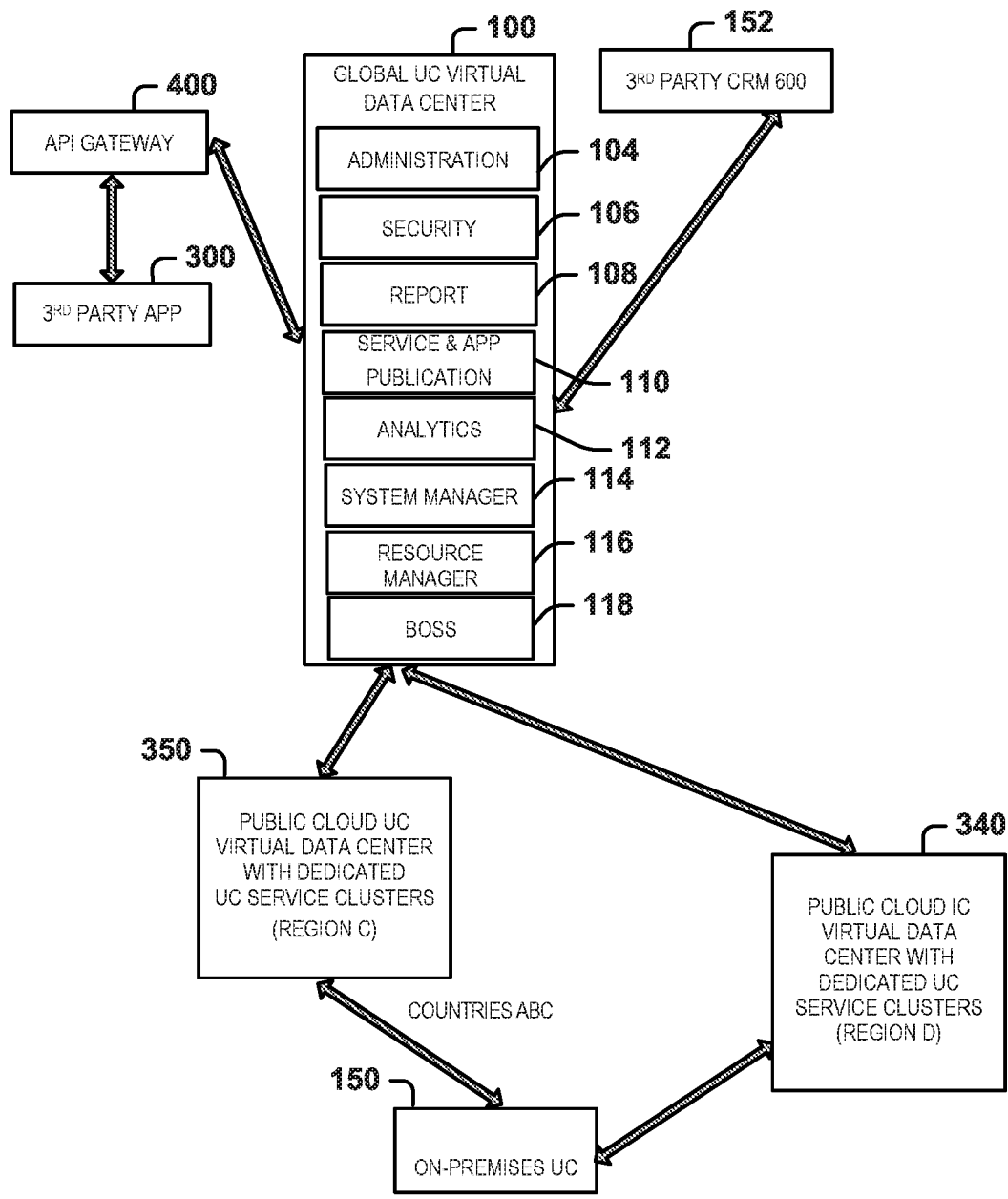
FIG. 8 depicts an example of a unified communication system architecture implementing public clouds within a plurality of regions with dedicated hardware resources for UC services.

FIG. 8 depicts another example of a UC hybrid cloud architecture 100 in which the global UC virtual data center 102 is connected via secure links to corresponding regional data centers. In the example of FIG. 8, regional data centers for regions C and D are each implemented as a public cloud UC virtual data center 350 and 340 that include dedicated service clusters for operating corresponding UC services in each respective region. The premise UC system 150 can be connected via a persistent link to the region C, whereas the region D's regional UC virtual data center 340 operating in public cloud can operate as a backup (e.g., in the event of disaster recovery).

Figure 9:
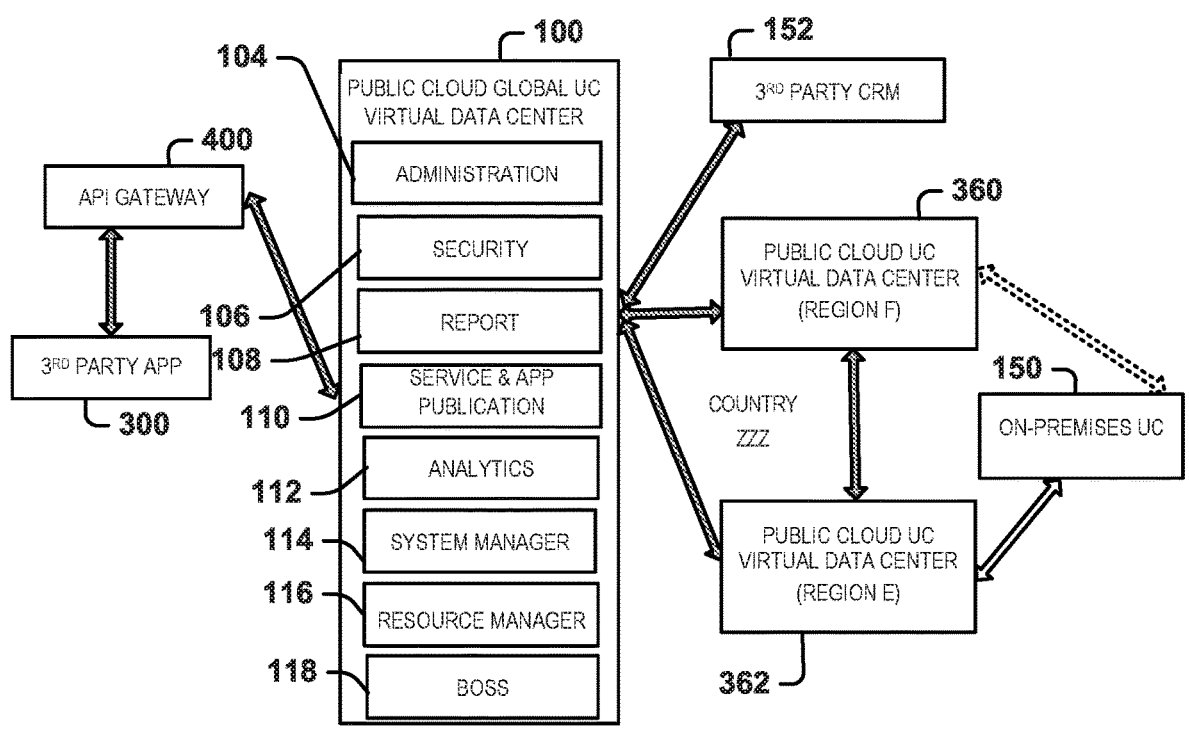
FIG. 9 depicts an example of a unified communication system architecture implementing public clouds in a plurality of regions without dedicated (shared) hardware instances for unified communication services.

In the example architecture 100 of FIG. 9, the public cloud global UC virtual data center 102 is connected via secure links to regional UC virtual data centers for regions E and F. In this example, each of E and F's clouds are implemented as public cloud UC virtual data centers 360 and 362. UC premise system 150 can be connected to one or both of the public cloud UC virtual data centers 360 and 362 to utilize UC services according to its SLA.

Figure 10:
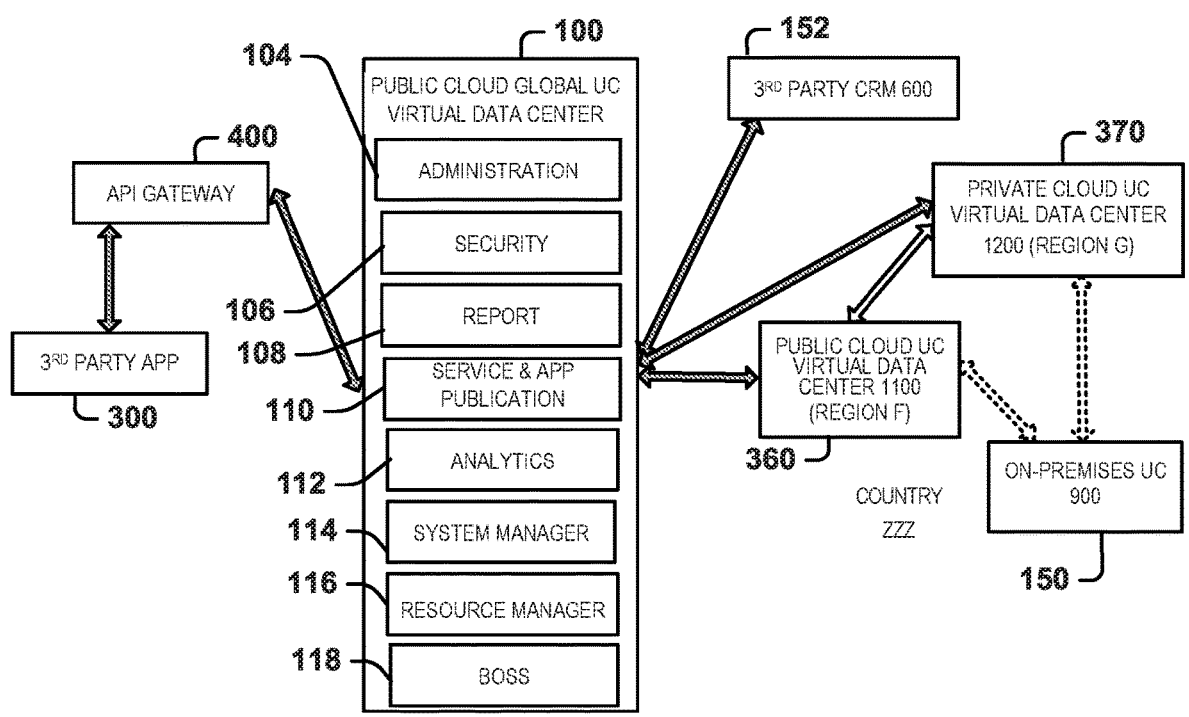
FIG. 10 depicts an example of a unified communication system architecture implementing hybrid private and public clouds within one or more regions.

As another example, FIG. 10 demonstrates a public cloud global UC virtual data center 102 that is coupled to regional UC virtual data centers for respective regions G and F. In this example, a public cloud UC virtual data center 360 is implemented for region F and a private cloud UC virtual center 370 for region G.

Figure 11:
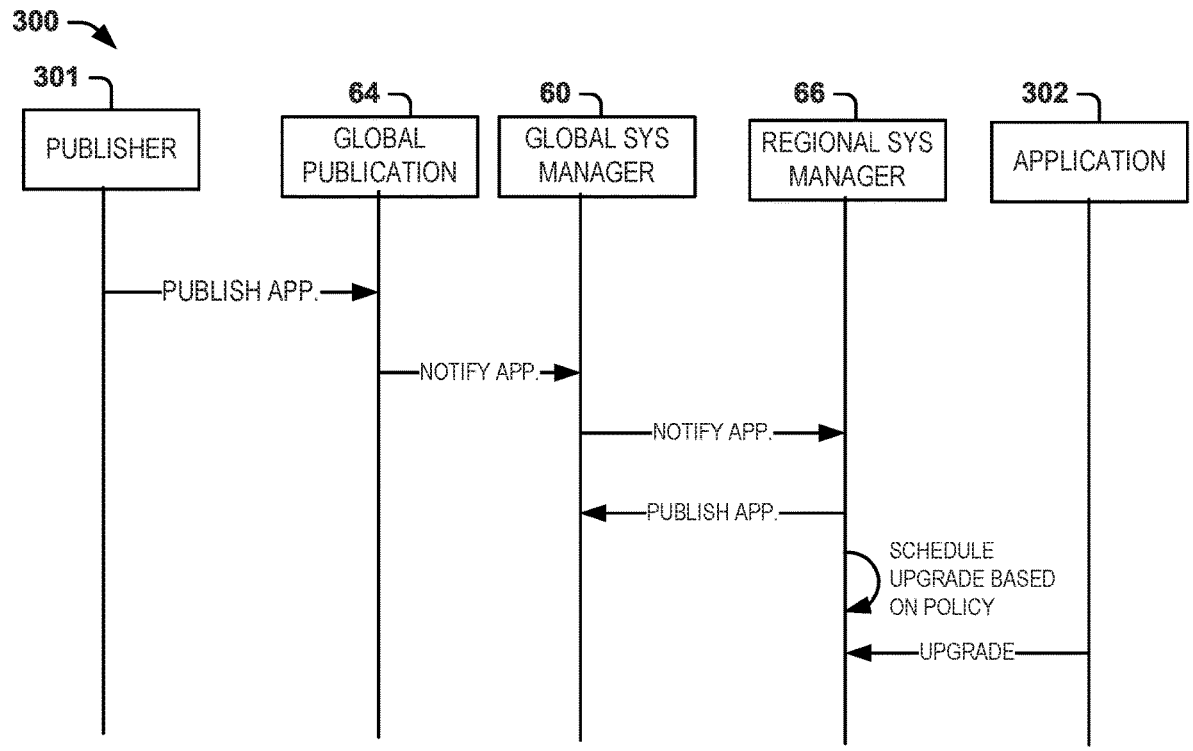
FIG. 11 is a signaling diagram illustrating a method for publishing an application for unified communications services in a hybrid cloud implementing unified communications.

FIG. 11 depicts an example of a signal diagram demonstrating publication of an application within a hybrid cloud architecture for deploying UC services. In the example of FIG. 11, reference can be made back to FIGS. 1-10 for additional information of examples architectures and components disclosed herein. In the example of FIG. 11, a publisher 301 publishes application code into the global UC system, in particular to the global virtual data center publication component 64. For example, the publisher 301 can be a trusted publisher that employs a secure link to upload a corresponding application or update to an application into the publication component 64. For example, the publisher 301 can be a developer, such as an individual or group of individuals that have generated computer executable code corresponding to a new UC service or a component of a UC service. The application code that is published thus can include a new version number or other code identifier to identify it as such.

In response to the published application component that has been published into the hybrid UC cloud, the publication component 64, the publication component can store an image (e.g., a copy of source code and associated metadata) of the UC component into image storage, such as a corresponding database and/or a file system (e.g., database 85). The publication component 64 can notify the global system manager 60 of the global UC virtual data center of the newly published component, such as a notification that identifies the published application and its related properties.

The published UC application code can include multiple components. For example, the code can include production code for the UC component, test automation code and/or deployment automation code. One or more such code component can be packaged together or be separately published in the global UC cloud to enable automated deployment of the application into an existing or new UC service. In response to the notification of the published UC application code, the global system manager 60 in turn notifies each regional UC virtual data center system manager of the published UC application code.

For example, the application notification to the regional system manager 66 can include data identifying the component identifier, version number or similar metadata to uniquely identify the component within the global UC system. As disclosed herein, each regional system manager 66 is configured with its own policy to control updates and upgrades of UC services. Accordingly, each regional system manager 66 will apply these policies to the notification from the global system manager 60 to ascertain whether to pull the UC application code from global UC storage. If the regional system manager 66 determines that the UC application code should be retrieved according to its established policies, the regional system manager issues a request to the global system manager to pull the UC code components. The UC application code components can include the executable code (e.g., corresponding to the upgrade), automated test code and automated deployment code to integrate the UC application code into the corresponding run-time application instance 302. Continuing with the example where the regional system manager 66 issues a request to pull the application, the regional system manager can implement and schedule a corresponding upgrade for the component based on its policy data. The regional system manager 66 can in turn upgrade the component of the application 302 by deploying and instantiating the UC code that has been retrieved from the global UC data. As disclosed herein, prior to deployment in its production mode, the UC application code can be deployed in the regional UC cloud with automated test code to ensure operating within expected parameters before entering the production mode for normal operation.

If the policy of a given regional system manager indicates that no update or upgrade should be required, no upgrade may occur. In some examples, the regional system manager can provide a denial response back to the global system manager indicating that the component will not be retrieved.

Figure 12:
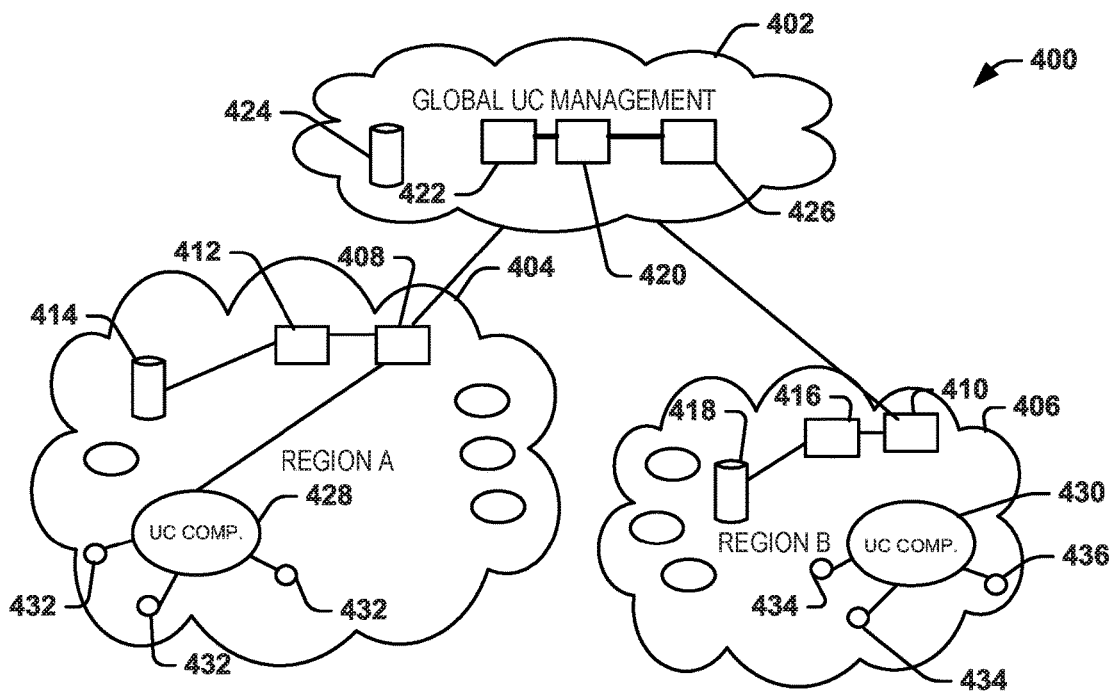
FIG. 12 depicts an example of a hybrid cloud unified communication system demonstrating a production mode of a unified communication service prior to upgrade of a unified communication service.
Figure 13:
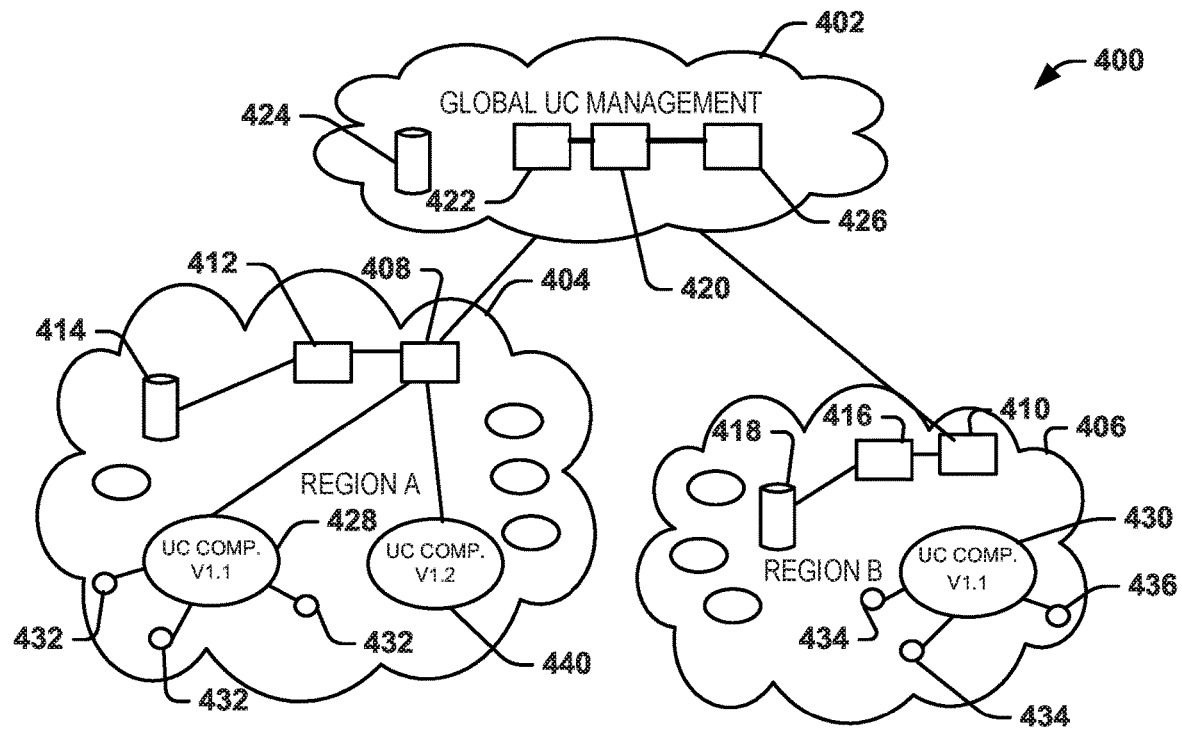
FIG. 13 depicts an example of a hybrid cloud unified communication system during a testing mode for a deployment upgrade.
Figure 14:
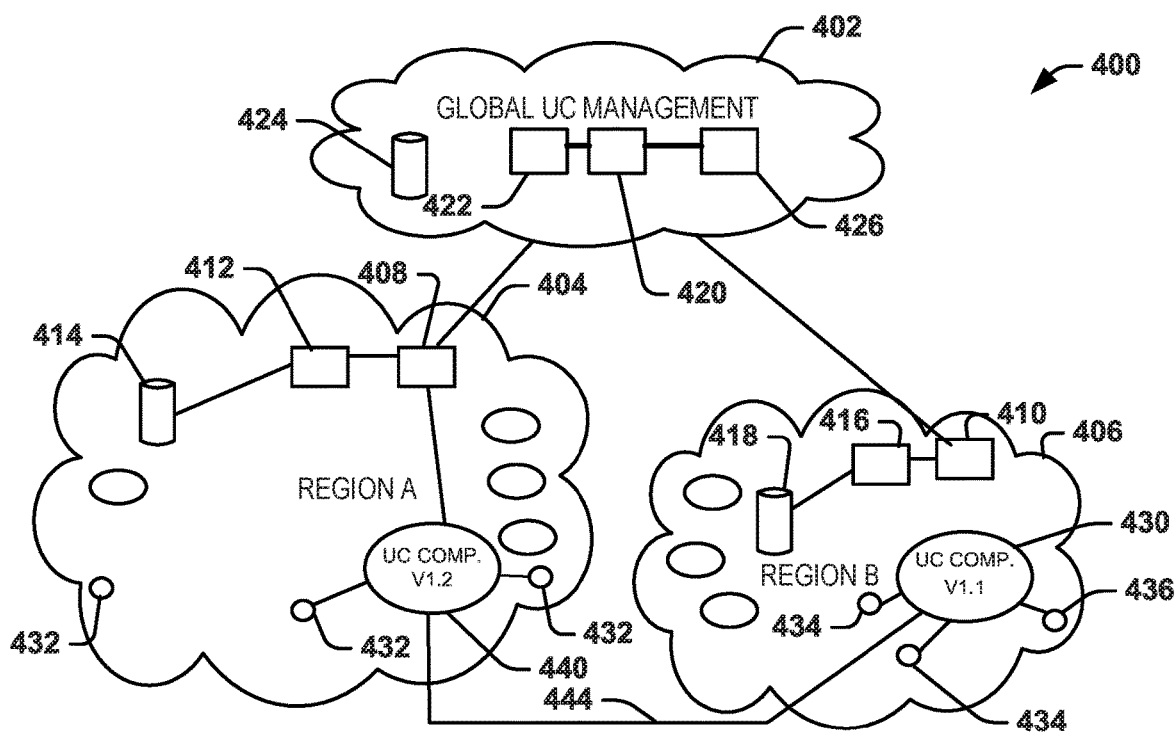
FIG. 14 depicts an example of a hybrid cloud unified communication system demonstrating a production mode following an upgrade of a unified communication service.

FIGS. 12, 13, and 14 demonstrate an example of an upgrade process that can be implemented in a hybrid UC cloud 400, such as disclosed herein. In the example of FIGS. 12-14, the hybrid UC cloud 400 includes a global UC management cloud 402, corresponding to a global virtual data center (e.g., 52) and a plurality of regional clouds 404, 406, corresponding to regional UC virtual data center 54. As disclosed herein, the global UC management cloud 402 can be connected with each regional cloud via a secure link (e.g., a VPN). The global UC management 402 can manage each of the regional clouds 404 and 406 by communicating with the regional system manager 408 and 410 thereof, respectively.

As disclosed herein, each regional cloud 404 also includes a resource manager 412 and a regional master database 414. Thus, the regional cloud 406 likewise includes a resource manager 416 and a corresponding master database 418. The global UC virtual data center, corresponding to global UC management cloud 402, similarly includes a global system manager 420, a global resource manager 422 and a corresponding master database 424, which constitutes a global repository for global system. Additionally, publication component 426 can be accessed (e.g., via an API) for automated deployment one or more software components into the cloud. For example, the request to the publication component 426 can be to upgrade and add a new feature to an existing UC application or service, or to add a new component for a new UC service into the hybrid UC cloud 400.

As an example, the UC component can correspond to a software component (e.g., machine readable instructions executable by a processor) designed for test automation, continuous integration and continuous deployment. It can be utilized by software developers to facilitate integration and deployment of software components into the hybrid UC cloud 400. The global system manager 420 thus can access the code that has been published and stored into the master database 424 by the publication component 426 to enable automated deployment in a test mode prior to deployment in its production mode.

As mentioned with respect to the signaling diagram of FIG. 11, in response to the publication of the UC component to the publication component 426, the global system manager 420 notifies system manager 408 and 410 of the regional clouds 404 and 406, respectively. In the example of FIG. 12, the component that has been published into the cloud back to the publication component 426, but has not yet had not been deployed into the regional clouds 404 and 406, such that the regional clouds 404 and 406 operate in a current production mode with respect to the UC service cluster before being upgraded. For example, the published UC component may correspond to an updated or upgraded version of a conferencing software service to enable multi party video and/or audio conferencing for each regional cloud 404 and 406. As an example, each of the UC components 428 and 430 can correspond to production mode versions (e.g., v1.1) prior to deployment of the updated component thereof in each respective region. As in prior examples, a plurality of end points 432 can utilize the deployed UC service component 428 such as corresponding to a UC service cluster. Similarly, in regional cloud 406, a plurality of end points 434 can be connected on-demand to utilize the UC component 430 as a corresponding UC service cluster.

As disclosed herein, in response to a notification from the global system manager 420, each of the regional systems manager 408 and 410 determines whether (or not) to implement the upgrade its regional cloud 404 and 406 for the corresponding UC service component that has been published to the publication component 426. In the example of FIG. 13, system manager 408 has been determined to schedule and deploy the upgrade component into the cloud 404, as demonstrated at version v1.2 of the service component 440. At this stage, the UC services component 440 is deployed in service cluster of a cloud in a testing mode (e.g., version v1.2 of the UC service). In the testing mode, the UC service component 440 can execute test automation code with respect to the UC services component 440 to ensure that the UC services component properly executes in the regional UC cloud 404 prior to deployment in the production mode.

In the example of FIG. 13, it is presumed that the system manager 410 has determined (based on its preprogrammed policy data) not to implement the upgrade for the UC component that has been published into the hybrid UC cloud system 400. Thus, the system manager 410 does not deploy a UC service cluster in a testing mode for the upgraded/updated component that has been published into the cloud. Thus, the approach disclosed herein demonstrates that each regional UC cloud 404 and 406 in the hybrid UC cloud system 400 can employ its own policy with respect to scheduling and implementing upgrades and updates that are provided from global UC management 402. This facilitates the automated process when updates and upgrades can be implemented for certain countries or regions that may not affect UC services in other regions within the hybrid UC cloud system 400. Thus, the new (e.g., upgraded) UC service component 440 in regional cloud 404 performs automated testing to determine whether the component will work properly according to expected operating parameters.

After the test has been completed according to test automation code, the regional system manager 408 activates deployment code associated with the published UC application code for deployment as part of the UC service component 440, namely by changing it to a production mode version 1.2. For example, in response to the automated test code passing completely (e.g., verifying that the published UC code operates within expected operating parameters), the system manager 408 can promote the new component (v 1.2) into the production mode. The promotion from testing to production mode can be implemented automatically in response to passing the automated testing or manually in response to a user input following such testing. The production mode version (v1.2) of the UC code implemented within the UC service component 440 is operational to receive and handle new service requests for respective UC services from endpoints 432.

Additionally, in connection with the UC code being activated from testing mode to production mode, the system manager 408 can gracefully shut down the v 1.1 production component 428, wherein gracefully dictates that ongoing usage of this version of the component may continue unaffected. For instance, the system manager 408 can redirect requests to the updated UC service component 440 and, after the endpoints and other devices within regional cloud 404 have completed their requests and use of such UC component 428, which implements version v1.1. Service continuity is maintained as new requests will be serviced by the recently updated v1.2 production component corresponding to the UC service component 440, as shown in FIG. 14. In the example of FIG. 14, the other regional UC cloud 406 still implements v1.1 as part of UC service component 430, thereby demonstrating how different regional clouds 404 and 406 can implement different versions of the same UC services. That is, each regional system manager 408 and 410 can be configured to implement a unique policy that determines how each respective upgrade/update is handled.

In some examples, depending on the types of service, the UC services between clouds 404 and 406 can be connected together via a communication link 444, which can be coordinated by the global system manager 420 thereby enabling interoperation and communication between UC service components 440 and 430 that have been deployed separately in the different clouds 404 and 406. For example, the connection 444 can be utilized by UC service clusters (e.g., audio/video conferencing services) 430 and 440 to implement conferencing that involve resources located in multiple regional clouds to enable and facilitate distributed conferencing over a wide geographic area. The global UC management 402 can enable similar interoperability among other types of UC services in different regions.

Figure 15:
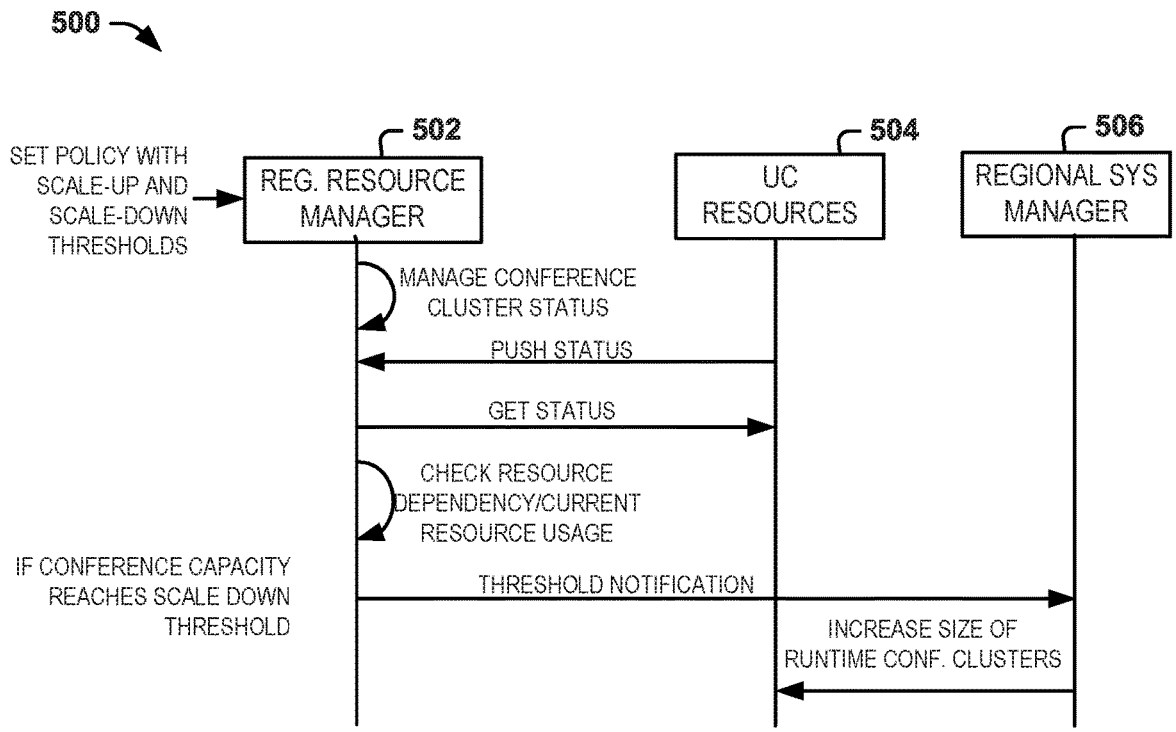
FIG. 15 depicts a signal diagram demonstrating a method for scaling up resources within a regional unified communication virtual data center.
Figure 16:
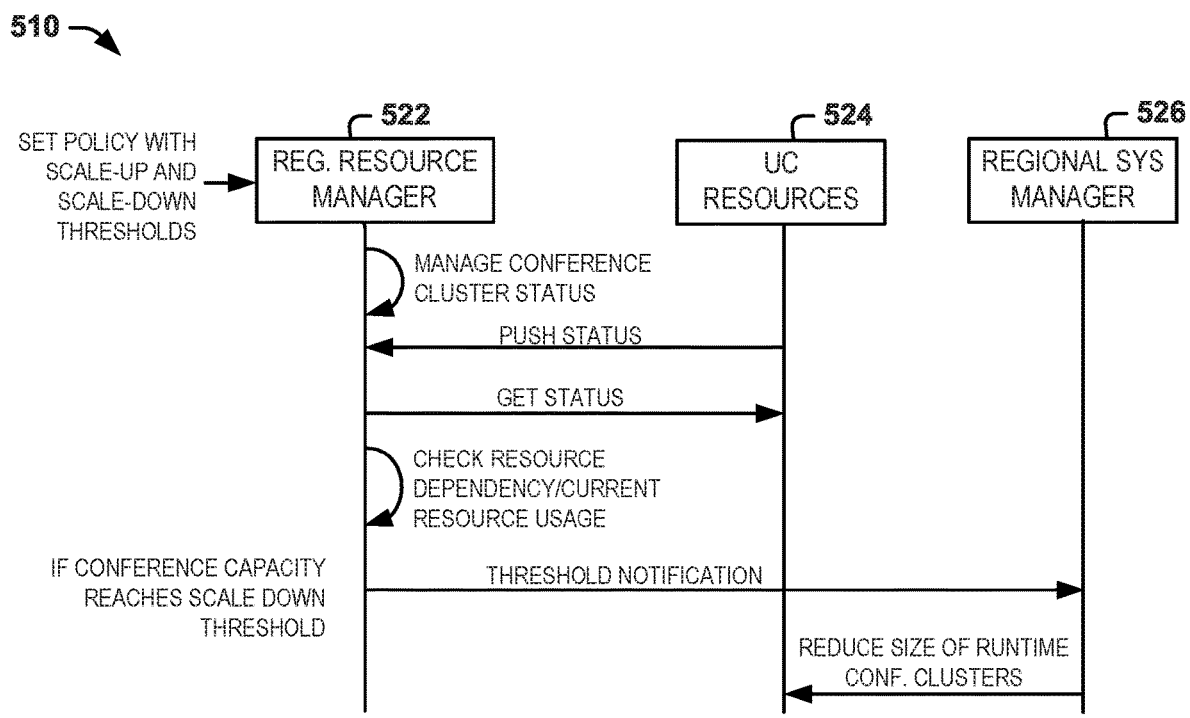
FIG. 16 is a signal diagram demonstrating a method of scaling down unified communication resources in a regional unified communication virtual data center.

As disclosed herein, each regional cloud system manages its own resources internally based on its respective policy, such as including scaling up or scaling down resources utilized in each UC service cluster. FIGS. 15 and 16 are signal diagrams demonstrating processes that can be utilized to implement scaling up and scaling down, respectively. The scaling process can depend upon the workload of UC resources (e.g. compute resource, network resource, storage, and UC components) within a given UC service cluster and thresholds that have been defined by corresponding policy. It is understood that the requirements and policies utilized to control scaling up and scaling down can be implemented independently for each respective regional UC cloud within the hybrid UC system. The examples of FIGS. 15 and 16 are demonstrated with respect to a single regional UC cloud.

FIG. 15 demonstrates an example of a signal diagram 500 for a given regional UC cloud. In this example, policy has been defined at a regional resource manager 502 such as to establish resource and capacity scale down thresholds. For instance, the regional resource manager 502 applies the threshold to status information acquired from a UC service cluster. Capacity thresholds can be established on a UC cluster-specific basis, which may accommodate technological and legal requirements for the region in with the data center resources are implemented.

As illustrated in FIG. 15, the regional resource manager 502 manages UC cluster status based on status information received from the respective resources. Each of the one or more UC resources 504 (in respective clusters) can push status information to the regional resource manager, such as a keep alive indicating that status information exists and specifying a cluster and resource identities. The regional resource manager 502 can also issue a request to get status from each of the UC resources 504 for each UC cluster. The regional resource manager 502 evaluates status information with respect to the capacity threshold defined by the regional policy for the respective UC service cluster. For example, the regional resource manager 502 in turns evaluates resource dependency and resource usage relative to the respective thresholds that have been established and stored in corresponding memory.

In the example of FIG. 15, regional resource manager 502 determines that UC service capacity usage has reached a corresponding scale up capacity threshold. In response to such determination regional resource manager 502 sends a scale up threshold notification to the regional system manager 506. Regional system manager 506 evaluates its policy with respect to the threshold notification and other operating parameters to ascertain appropriate to take, if any in response to the notification from the resource manager 502. In this example, it is assumed that the scale up threshold notification from the resource manager from the corresponding UC service cluster requires scaling up according to its policy. Accordingly, regional system manager 506 increases the size of the UC service cluster based on its policy. For example, the increase in size can be implemented by adding a virtual machine or Docker container to accommodate the necessary scaling by the threshold notification.

FIG. 16 illustrates an example of a signaling diagram 520 for a method that can be implemented at a regional UC cloud system for scaling down resources for a given UC service cluster. In the diagram 520 it is presumed that corresponding policy and capacity scale up and scale down thresholds have been established in the regional resource manager 522, which may vary among regional cloud systems. The resource manager 522 manages cluster status for a corresponding UC service cluster. Conference resources 524 in a given UC service cluster can push status information to the regional resource manager 522. The regional resource manager 522 can also issue a request to get status from the conference resources. The corresponding status information for a given UC service can be evaluated by the resource manager 522 to determine resource dependency relative to current resource usage. If regional resource manager 522 determines that capacity usage has reached its scale down capacity threshold (e.g., defined by its respective policy), the regional resource manager 522 can issue a threshold notification to the regional system manager 526. The regional system manger 526 handles automatic orchestration of the UC resources for the current UC service cluster that contains resources 524. In this example, regional resource manager 526 provides instructions to reduce the size of the UC service cluster according to its established policy. For example, in response to the instructions from system manager 526 the number of constant resources 524 can be reduced such as by removing a virtual machine or Docker container from the service cluster, depending on how the resources are being implemented. It is understood that each of the regional UC clouds can implement the methods demonstrated in the example of FIGS. 15 and 16 to continuously and dynamically scale up and down resources according to usage requirements and available capacity. The methods are equally applicable to public and private cloud deployments for the UC services in each respective region of the hybrid UC system disclosed herein.

Figure 17:
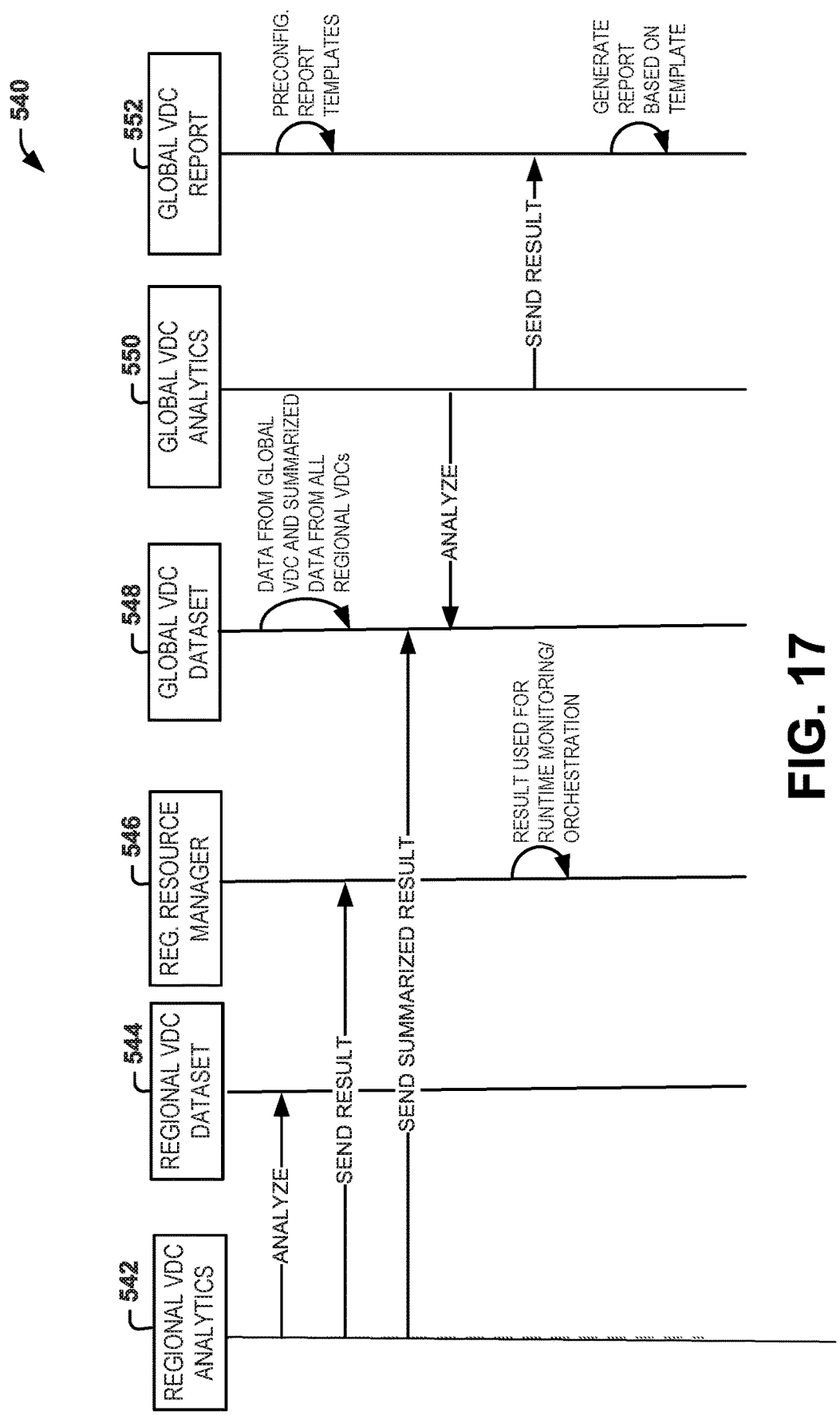
FIG. 17 is a signaling diagram for a hybrid cloud unified communication system demonstrating analytics that can be performed.

FIG. 17 depicts an example of analytics that can be performed in a hybrid UC cloud system 540. In the example of FIG. 17, data collection and monitoring is performed with respect to various regional and/or global components to perform the analytics to effect policy-based operational changes at respective regional and global levels including control UC services under one or more SLAB. For example, analytics implemented within a given regional UC cloud can drive both regional and global management and orchestration of cloud function.

In the example of FIG. 17, regional analytics 542 analyze a regional VDC data set 544. The regional data set 544 can be provided and stored in regional database based on monitoring and data provided by regional UC resources for one or more respective UC service cluster in each region. Regional analytics 542 thus can analyze the regional data set and provide corresponding results to the regional resource manager 546 as well as to the global data set 548. For example, regional resource manager 546 can employ the results of the analytics 542 for real time monitoring and orchestration of UC resources implemented within the regional UC cloud, such as including scale up and scale down resources in respective UC service clusters demonstrated in FIGS. 15 and 16.

In addition to regional analytics 542, global VDC analytics 550 can be performed with respect to monitored data that is received at global VDC analytics 550 (e.g., implemented in global UC virtual data center). For example, global VDC analytics 550 can analyze data from the global UC virtual data set 548 as well as summarize data from all the regional UC virtual data centers that have been provided to the global data set 548. Global analytics 550 thus can generate corresponding results based upon the analysis of the global data set 548 and issue such results to a global VDC report service 552. For example, global VDC report service 552 can employ one or more report templates preconfigured to compile statistics on various aspects of operating parameters to generate a corresponding global VDC report based on data that is aggregated into such reports. The reports can be tailored to certain customers within the system as well as to the general overall operation or different operating parameters within the global UC cloud.

Figure 18:
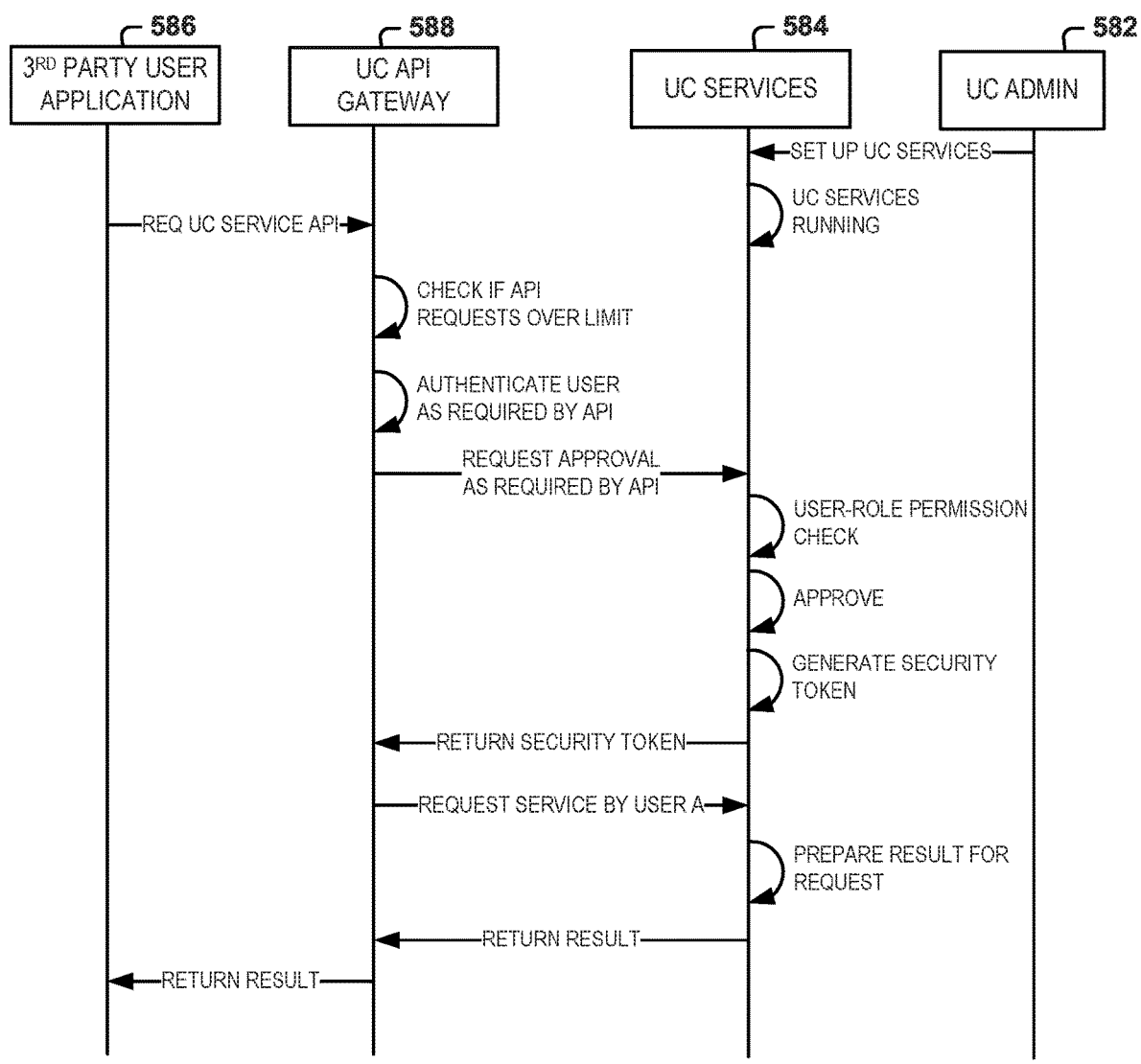
FIG. 18 is a signal diagram demonstrating an example of application interface to deploy a third party application or service within a hybrid cloud unified communication system.

FIG. 18 depicts an example of a signal diagram 580 to demonstrate functionality of an API gateway 582 to enable third party applications to utilize UC services deployed in the hybrid cloud. Third parties, for example, can be users of end point devices as well as communication service providers (e.g., carriers). In the example of FIG. 18, a UC administrator, demonstrated at 582, can configure and establish UC services 584 that are accessible to third parties within the hybrid UC cloud architecture. The corresponding UC services 584 thus can be running within the hybrid UC cloud such as deployed in respective regional UC clouds as disclosed herein. A third party application 586 (e.g., implemented by a corresponding user via an endpoint device) can employ the UC API gateway 588 to request a UC service API. The UC API gateway 588 can process the request to authenticate it (e.g., based on the user certificate). For instance, the API gateway 588 can determine if the API request exceeds a corresponding established request threshold.

In some examples, the UC API gateway 588 can authenticate the user if necessary by the API that has been requested. For instance, if approval is required, the UC API gateway can request approval to the corresponding UC services, such as by checking user-role-permissions contained in a security database of the UC services 584. UC services 584 can evaluate the request and it can be approved or denied. If the request is approved a corresponding security token can be generated and returned to the UC API gateway 588. In response to the security token that has been provided back in response to the request, UC API gateway can request the service by the corresponding user associated with the third party application 586 that initiated the request. In response to the service request, the UC services can prepare a corresponding result. The UC services in turn provide the result to the UC API gateway 588 which in turn provides the result to the third party application that initiated the request. As a result of the API request process demonstrated in the signal diagram 580 of FIG. 18, it is understood how third party applications can access all deployed UC services operating in the global UC cloud in a efficient and secured manner.

As disclosed herein, the hybrid UC cloud deployment to unified communications services provides the benefit of elastic scalability of public cloud while providing the required QoS and SLA that is provided in private cloud. For example, UC service providers can use the method to support conference calls in very cost-effective way such as described in FIG. 15 and FIG. 16. WAN (Wide Area Network) optimization using SDN (Software defined Networks utilizing Openflow) and/or NFV (Network Function Virtualization) to reserve the bandwidth will help to guarantee the QoS and SLA for the required UC services.

Disaster recovery can be supported in the proposed hybrid UC cloud deployment naturally in both active/active and active/standby modes. Referring back to FIG. 1, as a further example, assume that all the UC services in Region 1 and Region 2 are running in the active/active mode. Endpoints in Region 1 connect to UC services inside Region 1 while endpoints in Region 2 connect to UC services inside Region 2; the configuration data and runtime status are synchronized across Region 1 and Region 2 all the time. In case when UC services in Region 1 are out of service (e.g. disaster situations), all UC endpoints shall automatically connect to the UC services in Region 2 without any interruption to the UC services As another example if the UC service provider runs the UC services in Region 3 and Region N in FIG. 1 as active/standby mode (opposed to the active/active mode as we mentioned in the previous example for UC services in Region 1 and Region 2), the configuration data and runtime status are synchronized across Region 3 and Region N all the time. At the beginning, only Region 3 is active, Region N is standby; all the endpoints thus connect to Region 3. If there is disaster in Region 3, the UC services in Region N can be moved from standby state to active state, manually or automatically. In response to moving UC services in Region N to the active state, UC services in Region N provide all the UC services to all the UC endpoints previously connecting to Region 3.

As can be appreciated by those skilled in the art, portions of the invention may be embodied as a method, data processing system, or computer program product (e.g., a non-transitory computer readable medium having instructions executable by a processor). Accordingly, these portions of the invention may take the form of an entirely hardware embodiment, an entirely software embodiment, or an embodiment combining software and hardware. Furthermore, portions of the invention may be a computer program product on a computer-usable storage medium having computer readable program code on the medium. Any suitable non-transitory computer-readable medium may be utilized including, but not limited to, static and dynamic storage devices, hard disks, optical storage devices, and magnetic storage devices.

Certain embodiments are disclosed herein with reference to flowchart illustrations of methods, systems, and computer program products. It can be understood that blocks of the illustrations, and combinations of blocks in the illustrations, can be implemented by computer-executable instructions. These computer-executable instructions may be provided to one or more processor cores of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in a non-transitory computer-readable medium that can direct a computer or other programmable data processing apparatus (e.g., one or more processing core) to function in a particular manner, such that the instructions stored in the computer-readable medium result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks or the associated description.

What have been described above are examples. It is, of course, not possible to describe every conceivable combination of components or method, but one of ordinary skill in the art will recognize that many further combinations and permutations are possible. For example, while some examples disclosed herein may seem to describe a primarily multi-regional-based cloud system, the systems and methods disclosed herein can employ various combinations of features according to application requirements. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A hybrid unified communications (UC) cloud system comprising:
a plurality of regional UC virtual data centers, each operating independently and comprising:
a regional system manager to manage a set of regional UC resources implemented in a respective multi-tenant regional cloud having associated endpoint devices being registered to operate in at least one respective multi-tenant regional cloud and to employ corresponding regional UC resources thereof, operating in at least one service cluster of the respective multi-tenant regional cloud, to communicate real-time media traffic with respect to the associated endpoint devices; and
a regional resource manager to monitor utilization of regional UC resources and provide status information to the regional system manager based on the utilization of resources, the regional system manager to control scaling of the set of regional UC resources responsive to the status information;
a global virtual data center comprising:
a global UC virtual data center that includes a global system manager to manage each of the regional UC virtual data centers and to coordinate orchestration of UC resources between and/or among the regional UC virtual data centers, wherein in response to publication of a UC component to a publication service of the global virtual data center, corresponding to an upgrade of a given UC service component, via an upgrade API, the global system manager sends an upgrade notification to each of the regional UC virtual data centers to enable automatic deployment of the given UC service component at each of the regional UC virtual data centers based on established policy of each respective regional UC virtual data center.

2. The hybrid UC cloud system of claim 1, wherein the global system manager manages global publication of UC components and service packages with different levels of UC services to different regional UC virtual data centers, depending on a policy implemented at each of the regional UC virtual data centers.

3. The hybrid UC cloud system of claim 1, wherein in response to the upgrade notification from the global system manager, the regional system manager at each of the regional UC virtual data centers independently determines whether or not to schedule an upgrade for the given UC service component based on the established policy of each respective regional UC virtual data center.

4. The hybrid UC cloud system of claim 3, in response to a given regional system manager determining to schedule an upgrade for the given UC service component, the given regional system manager deploying an upgrade UC service cluster, which includes the given UC service component, in a testing mode concurrently and in parallel with a pre-upgrade version of the UC service cluster of resources.

5. The hybrid UC cloud system of claim 4, wherein in response to the given regional system manager determining that testing of the upgrade UC service cluster is successful, the given regional system manager promoting the upgrade UC service cluster, which includes the given UC service component, from the testing mode to a production mode to handle subsequent service requests to the services provided by the upgrade UC service cluster.

6. The hybrid UC cloud system of claim 5, wherein the given regional system manager gracefully shuts down the pre-upgrade version of the UC service cluster following promotion of the upgrade UC service cluster to the production mode, thereby allowing the pre-upgrade version of the UC service cluster to complete existing requests for UC services.

7. The hybrid UC cloud system of claim 1, wherein, in response to the upgrade notification for the given UC service component, at least two of the regional UC virtual data centers including a different version of the given UC service component according to differences in the established policy of the at least two regional UC virtual data centers.

8. The hybrid UC cloud system of claim 1, further comprising an application interface gateway to manage a set of application interfaces, the application interface gateway authenticating third party requests for application interfaces to selectively control access to UC services implemented within the plurality of regional UC virtual data centers.

9. The hybrid UC cloud system of claim 8, wherein, in response to a request for a given UC service application interface to access a corresponding UC service deployed in the hybrid UC cloud system, the application interface gateway requesting approval from the corresponding UC service to enable a respective third party requestor that initiated the request to access the corresponding UC service via the given UC service application interface that is provided to the respective third party requestor via the application interface gateway.

10. The hybrid UC cloud system of claim 1, wherein the regional resource manager in a respective one of plurality of regional UC virtual data centers monitors capacity of a given regional UC resource deployed in a run-time UC service cluster, and sends status information to the regional system manager of the respective regional UC virtual data center based on a comparison of the monitored capacity relative to at least one of a scale-down threshold or a scale-up threshold of the respective regional UC virtual data center, the regional system manager scales down or up a size of the run-time UC service cluster according to the policy of the respective regional UC virtual data center based on the status information relative to one of the scale-down threshold or the scale-up threshold.

11. The hybrid UC cloud system of claim 1, further comprising a premise UC system connected with an associated one of the plurality of regional UC virtual data centers to operate therein and enable end points registered for operation in the at least one premise UC system to utilize UC services of the associated regional UC virtual data center.

12. The hybrid UC cloud system of claim 1, wherein the endpoint devices are connected directly to UC services of the associated regional UC virtual data center.

13. The hybrid UC cloud system of claim 1, wherein the at least one service cluster comprises an arrangement of a plurality of virtual machines that share respective UC computing resources implemented within the respective regional UC virtual data center.

14. The hybrid UC cloud system of claim 13, wherein the regional system manager comprises a deployment engine that controls and handles deployment of UC services and application components using the virtual machines in the respective regional UC visual data center.

15. One or more non-transitory machine readable media having instructions executable by at least one processor to perform a method of deploying unified communications (UC) in a hybrid cloud, the method comprising:
    independently managing a set of regional UC resources implemented in each of a plurality of regional UC virtual data centers, associated endpoint devices being registered to utilize UC services deployed in at least one respective regional UC virtual data center and to employ corresponding regional UC resources thereof, operating in at least one service cluster of the respective multi-tenant regional cloud, to communicate real-time media traffic with respect to the associated endpoint devices;
    globally managing each of the plurality of regional UC virtual data centers and coordinating orchestration of UC resources between and/or among the regional UC virtual data centers;
    independently monitoring, at each of the plurality of regional UC virtual data centers, utilization of respective regional UC resources to provide status information based on the utilization of resources;
    controlling, at each of the plurality of regional UC virtual data centers, scaling of the set of regional UC resources based on the status information monitored for each respective regional UC data center; and
    sending an upgrade notification to each of the regional UC virtual data centers to enable automatic deployment of a given UC service component at each of the regional UC virtual data centers based on established policy of each respective regional UC virtual data center in response to publication of a UC component to a publication service of the global virtual data center, corresponding to an upgrade of the given UC service component, via an upgrade API.

16. A system comprising the one or more non-transitory machine readable media of claim 15.

17. The system of claim 16, comprising a plurality of regional UC virtual data centers.

18. The system of claim 16, comprising a global virtual data center.

19. The system of claim 16, comprising a private cloud data center.

* * * * *